US008884567B2

(12) United States Patent
Senkou et al.

(10) Patent No.: US 8,884,567 B2
(45) Date of Patent: Nov. 11, 2014

(54) APPARATUS FOR CARRYING OUT IMPROVED CONTROL OF ROTARY MACHINE

(75) Inventors: Tomohiro Senkou, Kariya (JP); Hiroshi Inamura, Kariya (JP); Koichi Nishibata, Kariya (JP)

(73) Assignee: Denso Corporation, Kariya (JP)

( * ) Notice: Subject to any disclaimer, the term of this patent is extended or adjusted under 35 U.S.C. 154(b) by 148 days.

(21) Appl. No.: 13/309,683

(22) Filed: Dec. 2, 2011

(65) Prior Publication Data

US 2012/0139460 A1 Jun. 7, 2012

(30) Foreign Application Priority Data

Dec. 2, 2010 (JP) .................................. 2010-269088

(51) Int. Cl.
*H02K 17/32* (2006.01)
*H02P 21/14* (2006.01)
*H02P 29/02* (2006.01)
*H02P 21/00* (2006.01)

(52) U.S. Cl.
CPC .......... *H02P 21/0096* (2013.01); *H02P 21/148* (2013.01); *H02P 29/022* (2013.01)
USPC ............ 318/434; 318/721; 318/727; 318/803

(58) Field of Classification Search
USPC .................. 318/128, 369, 432, 433, 434, 652, 318/721.727, 802, 803, 809–812
See application file for complete search history.

(56) References Cited

U.S. PATENT DOCUMENTS 6,781,333 B2  8/2004 Koide et al.
8,018,185 B2 * 9/2011 Yamamoto et al. ...... 318/400.15
8,269,439 B2 * 9/2012 Itoh ........................ 318/400.09
2002/0180402 A1 * 12/2002 Koide et al. ................. 318/727
2009/0237021 A1   9/2009 Yamamoto et al.

FOREIGN PATENT DOCUMENTS

| JP | 2000-050689 | | 2/2000 |
| JP | 2000-217388 | | 8/2000 |
| JP | 2000-262081 | | 9/2000 |
| JP | 2000262081 A | * | 9/2000 |
| JP | 2002-359996 | | 12/2002 |

(Continued)

OTHER PUBLICATIONS

Office Action (4 pages) dated Dec. 19, 2012 issued in corresponding Japanese Application No. 2010-269088 and English translation (3 pages).

*Primary Examiner* — Eduardo Colon Santana
*Assistant Examiner* — Bickey Dhakal
(74) *Attorney, Agent, or Firm* — Nixon & Vanderhye P.C.

(57) ABSTRACT

In a system for controlling a rotary machine, a circuit outputs an AC voltage to be applied to a rotary machine. A storage stores therein measurement-error information indicative of a measurement error of the measuring unit. A torque-feedback adjuster manipulates a phase of the output voltage of the circuit based on the rotational angle of the rotary machine measured by a measuring unit and the measurement-error information to adjust a torque of the rotary machine to a request torque. The phase is obtained from information fed back from the rotary machine. An abnormality determiner determines whether there is an abnormality to disable using accurate measurement-error information. A limiter limits adjustment of the torque of the rotary machine to the request torque by the torque-feedback adjuster when it is determined that there is an abnormality to disable using accurate measurement-error information.

24 Claims, 14 Drawing Sheets

(56) References Cited

FOREIGN PATENT DOCUMENTS

| JP | 2005-033932 | | | 2/2005 |
| JP | 2005033932 | A | * | 2/2005 |
| JP | 2005-098738 | | | 4/2005 |
| JP | 2005098738 | A | * | 4/2005 |
| JP | 2007-336707 | | | 12/2007 |
| JP | 2007336707 | A | * | 12/2007 |
| JP | 2008-253000 | | | 10/2008 |
| JP | P2009-232531 | A | | 10/2009 |
| JP | 2010-119268 | | | 5/2010 |

* cited by examiner

APPARATUS FOR CARRYING OUT IMPROVED CONTROL OF ROTARY MACHINE

CROSS REFERENCE TO RELATED APPLICATIONS

This application is based on Japanese Patent Application 2010-269088 filed on Dec. 2, 2010. This application claims the benefit of priority from the Japanese Patent Application, so that the descriptions of which are all incorporated herein by reference.

TECHNICAL FIELD

The present disclosure relates to apparatuses for controlling a rotary machine based on a variable output voltage of a circuit and a measured value of the rotational angle of the rotary machine by an angle sensor.

BACKGROUND

A type of such control apparatuses set forth above is disclosed in U.S. Pat. No. 8,018,185 B2 corresponding to Japanese Patent Application Publication No. 2009-232531. An example of the type of the control apparatuses is designed to determine a norm of an output voltage vector of an inverter in a two-phase rotating coordinate system defined in a rotor of a three-phase motor using a map; the inverter serves as a circuit for applying a variable output voltage to the three-phase motor. The map represents a relationship between a variable of the norm of the output voltage vector, a variable of a request torque for the three-phase motor, and a variable of a rotational speed thereof. For example, the control apparatus determines a waveform of each of drive signals for the inverter according to a modulation factor; the modulation factor is determined based on the determined norm of the output voltage vector of the inverter and an input voltage for the inverter. The phase of the output voltage of the inverter is set as a manipulated variable for feedback control of an actual torque of the three-phase motor.

As a result, each of the drive signals for the inverter is determined based on the phase of the output voltage of the inverter, and a value of the rotational angle of the three-phase motor measured by an angle sensor, such as a resolver; the phase serves as a manipulated variable for feedback control of the actual torque of the three-phase motor.

SUMMARY

There may be an error of location of the angle sensor, such as a resolver, for measuring the rotational angle of the three-phase motor, on the three-phase motor due to for example, misalignment between the three-phase motor and the angle sensor. For this reason, a correction value for the measured rotational angle of the angle sensor is previously obtained to be stored in a storage unit of the control apparatus; the correction value eliminates the effects of the error of location of the angle sensor.

However, if it is difficult to control the three-phase motor using the correction value due to, for example, a fault in the storage unit that stores therein the collection values, the phase of the output voltage of the inverter to be driven in the feedback control of the actual torque of the three-phase motor may become out of a tolerable range predetermined in normal operation of the three-phase motor. This may result in the occurrence of a failure in adjustment of the actual torque of the three-phase motor to the request torque.

In view of the circumstances set forth above, one aspect of the present disclosure seeks to provide apparatuses for controlling a rotary machine based on a variable output voltage of a circuit and a measured value of the rotational angle of the rotary machine by an angle sensor; these apparatuses are designed to address at least one of the problems set forth above.

Specifically, an alternative aspect of the present disclosure aims to provide such apparatuses capable of preventing the occurrence of a failure in torque feedback control.

According to a first exemplary aspect of the present disclosure, there is provided a system for controlling a rotary machine. The system includes a circuit configured to output an AC (Alternating Current) voltage to be applied to the rotary machine, a measuring unit configured to measure a rotational angle of the rotary machine, a storage configured to store therein measurement-error information indicative of a measurement error of the measuring unit, and a torque-feedback adjuster configured to manipulate a phase of the output voltage of the circuit based on the rotational angle of the rotary machine measured by the measuring unit and the measurement-error information to adjust a torque of the rotary machine to a request torque for the rotary machine. The phase is obtained from information fed back from the rotary machine. The system includes an abnormality determiner configured to determine whether there is an abnormality to disable using accurate measurement-error information, and a limiter configured to limit adjustment of the torque of the rotary machine to the request torque by the torque-feedback adjuster when it is determined that there is an abnormality to disable using accurate measurement-error information.

The system according to the first exemplary aspect of the present disclosure is configured to limit adjustment of the torque of the rotary machine to the request torque by the torque-feedback adjuster when it is determined that there is an abnormality to disable using accurate measurement-error information. This configuration prevents the occurrence of a failure in adjustment of the torque of the rotary machine to the request torque by the torque-feedback adjuster due to the abnormality.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
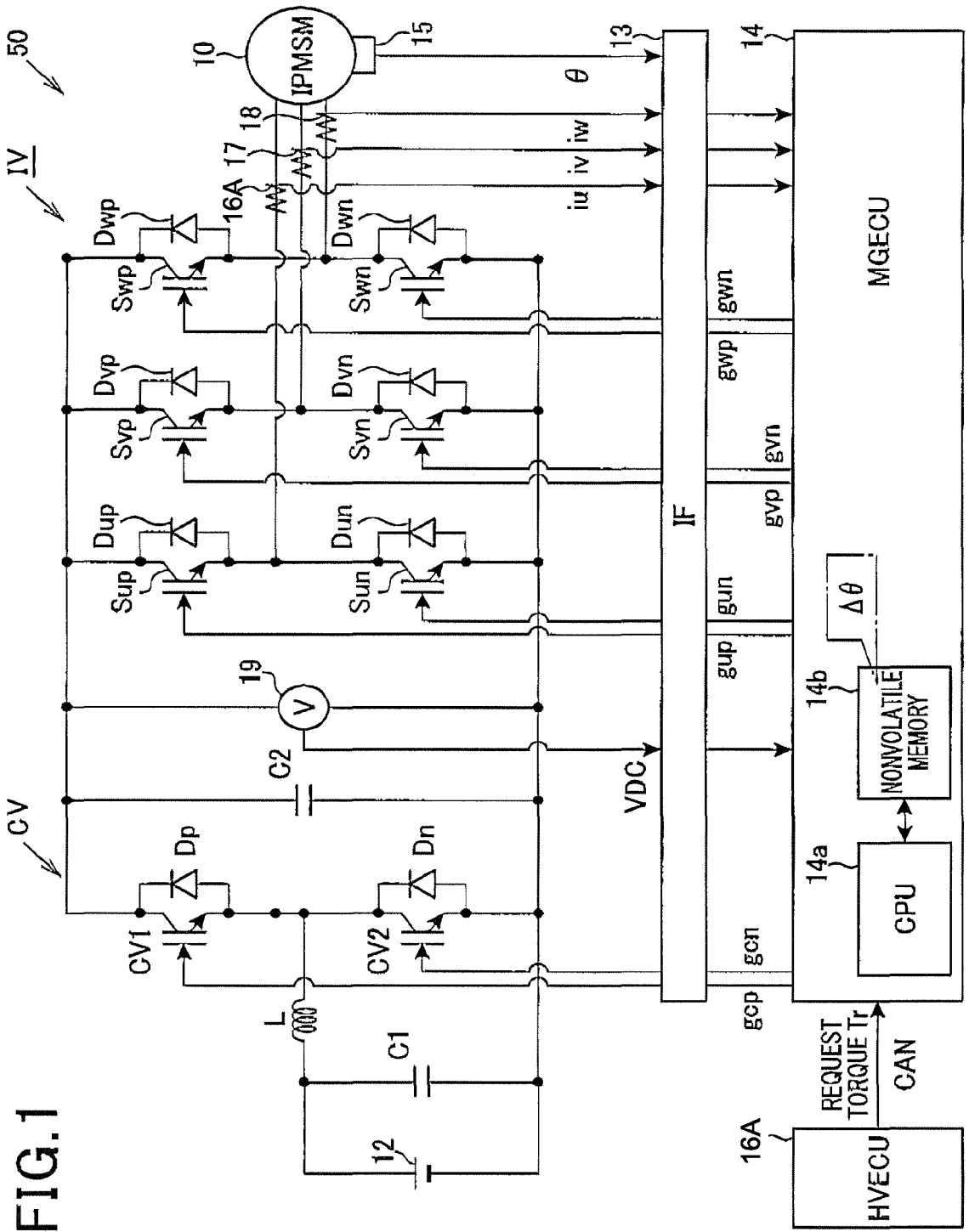
FIG. 1 is a circuit diagram of a control system according to the first embodiment of the present disclosure.

Embodiments of the present disclosure will be described hereinafter with reference to the accompanying drawings. In the embodiments, like parts between the embodiments, to which like reference characters are assigned, are omitted or simplified in redundant description.

First Embodiment

Referring to FIG. 1, there is illustrated a three-phase motor-generator, referred to simply as "motor-generator" 10 installed in, for example, a hybrid vehicle. In the first embodiment, as the motor-generator 10, a motor having a salient-pole structure is used. For example, as the motor-generator 10, an IPMSM (Interior Permanent Magnet Synchronous Motor) is used.

In FIG. 1, there is also illustrated a control system 50. The control system 50 is equipped with an inverter IV serving as a circuit for applying a variable output voltage to the motor-generator 10, a voltage converter CV, a high-voltage battery 12, an interface 13, a motor-generator control apparatus 14, and a host control apparatus 16A. For example, as the motor-generator control apparatus 14, an ECU for controlling the motor-generator 10 is applied, and as the host control apparatus 16A, an ECU for controlling the overall operations of the hybrid vehicle is applied. The motor-generator control apparatus will be referred to as a MGECU, and the host control apparatus will be referred to as an HVECU. Note that a "host control apparatus" relative to the MGECU 14 means that the host control apparatus is located upstream of the MGECU 14 on a transfer route through which signals from user interfaces, such as an accelerator pedal and a brake pedal, are communicated.

Specifically, the motor-generator 10 and the high-voltage battery 12 can establish electrical connection therebetween via the inverter IV and the voltage converter CV.

For example, the motor-generator 10 is provided with an annular rotor having an iron rotor core. The iron rotor core is, for example, directly or indirectly coupled to a crankshaft of an engine installed in the hybrid vehicle.

The rotor has a salient-pole structure.

Specifically, the rotor core of the rotor is provided at its circumferential portions with at least one pair of permanent magnets. The permanent magnets of the at least one pair are so embedded in the outer periphery of the rotor core as to be symmetrically arranged with respect to the center axis of the rotor core at regular intervals in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The rotor has a direct axis (d-axis) in line with a direction of magnetic flux created by the N pole, in other words, in line with a rotor N pole center line. The rotor also has a quadrature axis (q-axis) with a phase being $\pi/2$ radian electric angle leading with respect to a corresponding d-axis during rotation of the rotor. In other words, the q-axis is electromagnetically orthogonal to the d-axis.

The d and q axes constitute a d-q coordinate system (rotating coordinate system) defined in the rotor of the motor-generator 10.

An inductance Ld in the d-axis is lower than an inductance Lq in the q-axis because the permanent magnets have a magnetic permeability constant lower than that of the iron. Motors having a salient-pole structure means motors each having this inductance characteristic of the rotor.

The motor-generator 10 is also provided with a stator. The stator includes a stator core with, for example, an annular shape in its lateral cross section. The stator core is disposed around the outer periphery of the rotor core such that the inner periphery of the stator core is opposite to the outer periphery of the rotor core with a predetermined air gap.

For example, the stator core also has a plurality of slots. The slots are formed through the stator core and are circumferentially arranged at given intervals. The stator also includes a set of three-phase windings (armature windings wound in the slots of the stator.

The three-phase windings are wound in the slots such that the U-, V-, and W-phase windings are shifted by an electric angle of, for example, $2\pi/3$ radian in phase from each other.

For example, the three-phase armature windings (U-, V-, and W-phase windings) each have one end connected to a common junction (neutral point) and the other end to a separate terminal in, for example, a star-configuration.

The motor-generator 10 is operative to receive at its three-phase windings three-phase currents to thereby generate a rotating magnetic flux; this allows the rotor to turn based on magnetic attractive force between the rotating magnetic flux and a magnetic flux of the rotor.

The voltage converter CV includes a coil L, a capacitor C1, a capacitor C2, a pair of series-connected switching elements CV1 and CV2, and a pair of flywheel diodes Dp and Dn.

One electrode of the capacitor C1 is connected to a positive terminal of the high-voltage battery 12, and the other thereof to a negative terminal of the high-voltage battery 12. One end of the coil L is connected to both the positive terminal of the high-voltage battery 12 and the one electrode of the capacitor C1.

In the first embodiment, as the switching elements CV1 and CV2, IGBTs (Insulated Gate Bipolar Transistors) are respectively used. The flywheel diodes Dp and Dn are connected in antiparallel to the switching elements CV1 and CV2, respectively. The other end of the coil L is connected to a point at which the switching elements CV1 and CV2 are electrically connected in series.

When power MOSFETs are used as the pair of switching elements CV1 and CV2, intrinsic diodes of the power MOSFETs can be used as the flywheel diodes, thus eliminating the flywheel diodes.

The capacitor C2 is connected in parallel to the pair of high- and low-side switching elements CV1 and CV2.

The high-voltage battery 12 is designed as a rechargeable battery and has a nominal voltage of, for example, 288 V.

For example, when the control system 50 operates in a power-running control mode, the switching elements CV1 and CV2 of the voltage converter CV are driven on and off. This converts a voltage across the battery 12 into a higher voltage using electromagnetic energy stored in the coil L by the on and off switchings of the switching elements CV1 and CV2. For example, when a voltage across the battery 12, referred to as "battery voltage" is 288 V, the voltage converter CV works to boost the battery voltage of 288 V to a preset voltage equal to or lower than its upper limit of, for example, 666 V.

In addition, when the control system 50 operates in a regenerative control mode during the hybrid vehicle being decelerated, the motor-generator 10 serves as a generator to thereby convert mechanical power based on the rotation of the motor-generator 10 into electrical power. The electrical power is converted by the inverter IV into DC power. The switching elements CV1 and CV2 of the voltage converter CV are driven on and off. This converts a voltage across the capacitor C2 based on the converted DC power into a lower voltage based on voltage drop across the coil L by the on and off switchings of the switching elements CV1 and CV2. The lower voltage stepped down from the voltage across the capacitor C2 is charged in the battery 12.

The inverter IV serves as, for example, a circuit configured to output an AC (Alternating Current) voltage to be applied to the motor-generator 10. Specifically the inverter IV is designed as a three-phase inverter. The inverter IV is provided with a first pair of series-connected high- and low-side (upper and lower-arm) switching elements Sup and Sun, a second pair of series-connected high- and low-side (upper- and lower-arm) switching elements Svp and Svn, and a third pair of series-connected high- and low-side (upper- and lower-arm) switching elements Swp and Swn. The inverter IV is also provided with flywheel diodes Dup, Dun, Dvp, Dvn, Dwp, and Dwn electrically connected in antiparallel to the switching elements Sup, Sun, Svp, Svn, Swp, and Swn, respectively.

In the first embodiment, as the switching elements Sup, Sun, Svp, Svn, Swp, and Swn, IGBTs are respectively used.

When power MOSFETs are used as the switching elements Sup, Sun, Svp, Svn, Swp, and Swn, intrinsic diodes of the power MOSFETs can be used as the flywheel diodes, thus eliminating the flywheel diodes.

The first to third pairs of switching elements are parallelly connected to each other in bridge configuration.

A connecting point through which the switching elements Sup and Sun of the first pair are connected to each other in series is connected to an output lead extending from the separate terminal of the U-phase winding. Similarly, a connecting point through which the switching elements Svp and Svn of the second pair are connected to each other in series is connected to an output lead extending from the separate end of the V-phase winding. Moreover, a connecting point through which the switching elements Swp and Swn of the third pair are connected to each other in series is connected to an output lead extending from the separate end of the W-phase winding.

One end of the series-connected switching elements of each of the first, second, and third pairs, such as the drain of the corresponding high-side switching element, is connected to the positive terminal of the battery 12 via a positive terminal of the inverter IV, the switching element CV1 and the coil L. The other end of the series-connected switching elements of each of the first, second, and third pairs, such as the source of the corresponding low-side switching element, is connected to the negative terminal of the battery 12 via a negative terminal of the inverter IV.

The control system 50 is equipped with, as means for detecting operating conditions of each of the motor-generator 10 and the inverter IV, a rotational angle sensor 15, current sensors 16, 17, and 18, and a voltage sensor 19.

The rotational angle sensor 15 serves as, for example, a measuring unit configured to measure a rotational angle of the rotor of the motor-generator 10. Specifically the rotational angle sensor 15 is arranged such that its rotor portion is coaxial to the rotor of the motor-generator 10 and operative to measure an actual rotational angle (electric angle) $\theta$ of the d-axis of the rotor with respect to a stator coordinate system fixed in space which characterizes the three-phase windings of the stator. The rotational angle sensor 15 is also operative to measure an actual electric angular velocity (rotational velocity) $\omega$ of the d-axis of the rotor. The electric angular velocity $\omega$ will be referred to as "angular velocity $\omega$" hereinafter. The rotational angle sensor 15 is communicable with the MGECU 14 via the interface 13 and operative to send, to the MGECU 14, the measured actual rotation angle $\theta$ and angular velocity $\omega$ of the rotor as some of motor-generator state variables.

The current sensor 16 is arranged to allow measurement of an instantaneous U-phase alternating current iu actually flowing through the U-phase winding of the stator. Similarly, the current sensor 17 is arranged to allow measurement of an instantaneous V-phase alternating current iv actually flowing through the V-phase winding of the stator. The current sensor 18 is arranged to allow measurement of an instantaneous W-phase alternating current iw actually flowing through the W-phase winding of the stator.

The current sensors 16, 17, and 18 are communicable with the MGECU 14 through the interface 13.

Specifically, each of the current sensors 16, 17, and 18 is operative to send, to the MGECU 14, the instantaneous value of a corresponding one of the U-, V-, and W-phase alternating currents as some of the motor-generator state variables.

The voltage sensor 19 is arranged to allow measurement of an input voltage (power supply voltage) VDC to be applied to the inverter IV. The voltage sensor 19 is communicable with the MGECU 14 through the interface 13, and operative to send, to the MGECU 14, the inverter input voltage VDC to be applied to the inverter IV as one of the motor-generator state variables.

The measured values of the sensors 15 to 19 are captured, via the interface 13, to the MGECU 14. The MGECU 14 can perform CAN (Controller Area Network) communications with the HVECU 16A using a CAN protocol. In the first embodiment, the MGECU 14 is operative to receive a request torque Tr for the motor-generator 10.

Specifically, the MGECU 14 is designed to generate and output drive signals for driving the converter CV and the inverter IV based on the measured values of the sensors 15 to 19 to thereby adjust an actual torque of the motor-generator 10 to be matched with the request torque Tr.

Drive signals gcp and gcn to be outputted from the MGECU 14 are for driving the switching elements CV1 and CV2, respectively. Drive signals gup and gun to be outputted from the MGECU 14 are for driving the switching elements Sup and Sun, respectively. Drive signals gvp and gvn, to be outputted from the MGECU 14 are for driving the switching elements Svp and Svn, respectively. Drive signals gwp and gwn to be outputted from the MGECU 14 are for driving the switching elements Swp and Swn, respectively. Each of the drive signals gcp, gcn, gup, gun, gvp, gvn, gwp, and gwn is, for example, a pulse signal with a controllable pulse width (a controllable on duration).

The MGECU 14 is designed as, for example, a computer circuit consisting essentially of, for example, a CPU 14a and a nonvolatile memory 14b serving as a storage, and operates on a voltage lower than the battery voltage. Thus, the MGECU 14 constitutes a low voltage system, and the motor-generator 10, the inverter IV, the converter CV, and the high-voltage battery 12 constitute a high voltage system.

In the nonvolatile memory 14b, a correction value $\Delta\theta$ in digital from for correcting the rotational angle $\theta$ measured by the rotational angle sensor 15 is previously stored. For example, the correction value $\Delta\theta$ in digital form includes an error detection code. Specifically, the correction value $\Delta\theta$ is to correct an error included in the measured rotational angle $\theta$ due to, for example, misalignment between the rotational angle sensor 15 and the rotor of the motor-generator 10 caused at, for example, the location of the rotational angle sensor 15 to the motor-generator 10. At or immediately after the time of manufacture of the rotary-machine system comprised of the motor-generator 10 and the control system 50, measurement of the error included in the measured rotational angle of the rotational angle sensor 15 allows the correction value $\Delta\theta$ to be calculated, and the correction value $\Delta\theta$ is stored in the nonvolatile memory 14b.

That is, each time a value of the rotational angle $\theta$ is measured by the rotational angle sensor 15, the MGECU 14 is operative to add, to the measured value of the rotational angle $\theta$, the correction value $\Delta\theta$ stored in the nonvolatile memory 14b, and adjust the actual torque of the motor-generator 10 to the request torque Tr in accordance with, as the rotational angle $\theta$ of the rotor (motor-generator 10), the sum of the rotational angle $\theta$ of the rotor (motor-generator 10) and the correction value $\Delta\theta$. The nonvolatile memory 14b is, for example, a memory that holds data regardless of whether the nonvolatile memory 14b is energized or not. For example, an electrically rewritable read-only memory.

Figure 2:
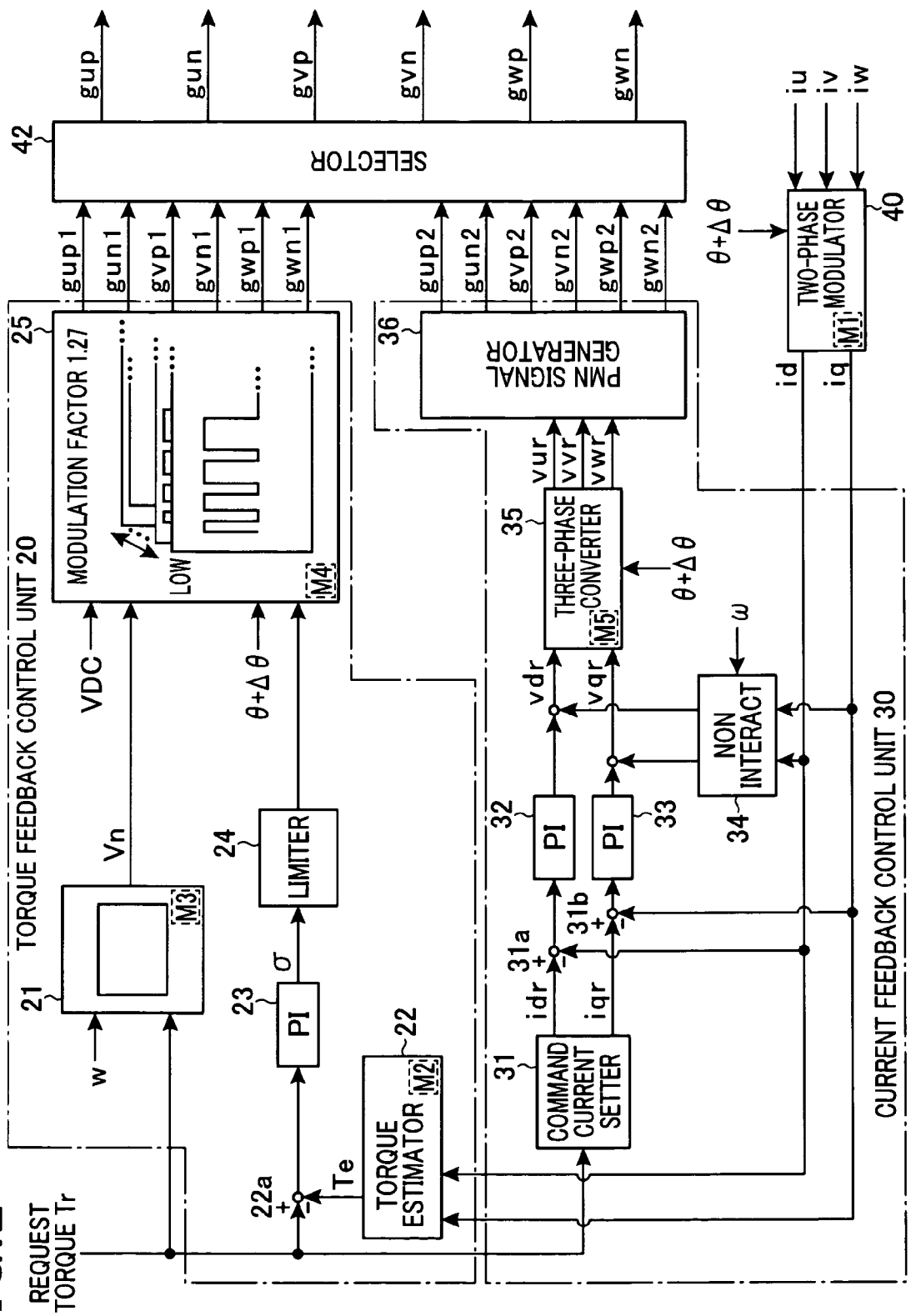
FIG. 2 is a block diagram schematically illustrating functional modules of a MGECU equivalent to tasks to be executed thereby according to the first embodiment.

FIG. 2 schematically illustrates functional modules of the MGECU 14 equivalent to tasks to be executed by the MGECU 14.

As illustrated in FIG. 2, the MGECU 14 includes a two-phase converter 40, a torque-feedback control unit 20, a current-feedback control unit 30, and a selector 42; these units 20 and 30 are operatively associated with one another.

Next, functional modules included in the torque-feedback control unit 20, functional modules included in the current-feedback control unit 30, and a fail-safe task to be executed by the MGECU 14 will be described hereinafter in this order. The torque-feedback control unit 20 and the current-feedback control unit 30 are disclosed, for example, in U.S. Pat. No. 8,018,185B2 assigned to the same assignee as that of this application. Thus, the disclosures of the US patent are all incorporated herein by reference.

Each of or some of the functional modules included in the MGECU 14 can be designed as a hardwired logic circuit, programmed logic circuit, or hardwired-logic and programmed-logic hybrid circuit.

The two-phase converter 40 has, for example, a map M1 in data-table format, in mathematical expression format, and/or program format. The map M1 allows the two-phase converter to calculate cosine functions.

Specifically, the two-phase converter 40 works to receive actual instantaneous U-, V-, and W-phase alternating currents iu, iv, and iw measured by the respective current sensors 16, 17, and 18 and the corrected rotational angle ($\theta+\Delta\theta$) of the motor-generator 10 (the d-axis of the rotor). The two-phase converter 40 also works to convert the received actual instantaneous U-, V-, and W-phase alternating currents iu, iv, and iw in the stator coordinate system into actual d-axis and q-axis current components id and iq in the d-q coordinate system of the rotor based on the corrected rotational angle ($\theta+\Delta\theta$) of the motor-generator 10 and the map M1.

Torque Feedback Control Unit

The torque-feedback control unit 20 serves as, for example, a torque-feedback adjuster. Specifically, the torque-feedback control unit 20 is configured to adjust the actual torque of the motor-generator 10 to the request torque Tr based on a deviation of the request torque Tr from an estimated torque of the motor-generator 10.

Specifically, the toque feedback control unit 20 includes a norm setter 21, a torque estimator 22, a deviation calculator 22a, a phase setter 23, a limiter 24, and a drive signal generator 25. The cooperative operations of the modules 21, 22, 22a, 23, 24, and 25 carry out a torque-feedback control task described hereinafter.

The torque estimator 22 works to calculate an estimated torque Te to be created by the motor-generator 10 based on the d-axis and q-axis current components id and iq passed from the two-phase converter 40. For example, the torque estimator 22 calculates the estimated torque Te to be created by the motor-generator 10 using, for example, a map M2 in data-table format, in mathematical expression format, and/or program format. The map M2 represents a function (relationship) between a variable of the estimated torque Te and a pair of variables of the d-axis and q-axis current components id and iq. The torque estimator 22 can retrieve the estimated torque Te whose value corresponds to the d-axis and q-axis current components id and iq in the map M2. The torque estimator 22 also can calculate an estimated torque Te in accordance with a model equation. Assigning the d-axis and q-axis current components id and iq to the model equation allows the estimated torque Te to be calculated.

The deviation calculator 22a works to calculate a deviation Δ of the request torque Td from the estimated torque Te.

The phase setter 23 works to set, based on the deviation Δ passed from the deviation calculator 22a, a phase δ of an output voltage (output voltage vector) of the inverter IV in the d-q coordinate system.

Specifically, in the first embodiment, the phase setter 23 computes the phase of the inverter output voltage using a proportional gain term and an integral gain term of a proportional integral feedback algorithm.

In the proportional integral feedback algorithm, the phase of the inverter output voltage is expressed based on the proportional gain term and integral gain term.

The proportional gain terra contributes to change in the phase of the inverter output voltage in proportion to the deviation Δ. The integral gain term is proportional to an accumulated offset of instantaneous values of the deviation Δ over time to reset the accumulated offset (steady-state deviation) over time to zero.

The limiter 24 works to limit the phase δ of the output voltage vector within a predetermined tolerable range described later.

The norm setter 21 works to set a norm Vn of a vector of the inverter output voltage in the d-q coordinate system based on the actual angular velocity ω of the motor-generator 10 and the request torque Tr. For example, the norm setter 21 stores therein a map M3 in data-table format, in mathematical expression format, and/or program format. The map M3 represents a function (relationship) between a variable of the request torque Tr, a variable of the angular velocity ω of the motor-generator 10, and a variable of the norm Vn of the output voltage vector of the inverter IV. The norm setter 21 can retrieve the norm Vn whose value corresponds to a value of the request torque Tr and a value of the angular velocity ω of the motor-generator 10. Note that the norm of a vector is defined as the root sum square of components of the vector. The map M3 is designed such that the set norm Vn allows a maximum torque control to be carried out. For example, the maximum torque control is designed to achieve a maximum torque with minimum armature current, in other words, most efficiently achieve a torque of the motor-generator 10 with minimum armature current. The maximum torque means the positive maximum torque to be created by the motor-generator 10 in a power-running control mode, and means a negative torque whose absolute value is maximum to be created by the motor-generator 10 in the regenerative control mode.

The drive signal generator 25 serves as, for example, a waveform determiner. Specifically, the drive signal generator 25 works to generate based on: the phase δ (exactly, a guarded value of the phase δ by the limiter 24); the norm Vn set by the norm setter 21; the power supply voltage (inverter input voltage) VDC; and the actual rotational angle θ, first drive signals gup1, gun1, gvp1, gvn1, gwp1, and gwn1. Each of the first drive signals gup1, gun1, gvp1, gvn1, gwp1, and gwn1 is a pulse signal.

Specifically, the drive signal generator 25 stores therein a plurality of maps M4 in data-table format, in mathematical expression format, and/or program format. Each of the maps M4 represents a function (relationship) between:

a drive-signal waveform for a corresponding one pair of the first to third pairs of switching elements per one period (electric angle of 360 degrees) of the rotor (motor-generator 10); and each of a plurality of prepared values of a modulation factor of the inverter IV.

Note that the modulation factor of the inverter IV is defined as a ratio of an amplitude of each of three-phase command voltages vur, vvr, and vwr described later to the half of the inverter input voltage (power supply voltage) VDC.

When the modulation factor is set to 1, the amplitude (peak value) of each of the command voltages vur, vvr, and vwr is set to "VDC/2". This means an RMS value of each of the command voltages Vur, Vur, and Vwr is equal to "(VDC/2)·(1/√2)".

The norm Vn of the vector of the inverter output voltage in the d-q coordinate system corresponding to command voltages vdr and vqr described later, which is equivalent to a line-to-line command voltage between adjacent any two phases, is the product of √3 and one-phase command voltage; this product is equal to "(VDC/2)·(1/√2)·√3". Thus, the norm Vn of the vector of the inverter output voltage in the d-q coordinate system is represented as "VDC·$\sqrt{3/8}$" when the modulation factor is set to 1.

Thus, the driving signal generator 25 can calculate a value of the modulation factor based on the inverter input voltage VDC and the norm Vn, and selects one map (one drive-signal waveform) for each switch pair from the plurality of maps M4; this selected map corresponds to the calculated value of the modulation factor.

One pair of the high- and low-side switching pairs will be referred to simply as "one switch pair", and each pair thereof to "each switch pair" hereinafter. Referring to FIG. 2, a maximum level "H" of the drive-signal waveform for each switch pair represents the on state of the high-side switching element S*p (*=u, v, and w) and the off state of the low-side switching element S*n. A base level "L" thereof represents the on state of the low-side switching element Sun and the off state of the high-side switching element Sup.

Note that the upper limit of the plurality of prepared values of the modulation factor is for example set to be substantially 1.27. The modulation factor of substantially 1.27 is known to be a maximum value when the MGECU 14 operates to control the inverter IV in a single-pulse control mode (a rectangular-wave control mode). In the rectangular-wave control mode, each of the switching elements of the inverter IV is individually switched on and off such that the on and off period of each of the switching elements is substantially matched with one period of a periodic command voltage; this one period corresponds to an electric angle of 2π radians.

For this reason, when the calculated value of the modulation factor is 1.27, the drive signal generator 25 selects one map for each switch pair from the plurality of maps M4; this selected map corresponds to the calculated value 1.27 of the modulation factor for a corresponding one switch pair. The modulation factor of 1.27 can be converted into the voltage utilization factor of the order of 0.78 The voltage utilization factor means the ratio of the magnitude of the inverter output voltage to the inverter input DC voltage.

The drive-signal waveform of the one selected map for each switch pair is configured such that on and off period of a corresponding one switch pair is matched with the period of a corresponding phase command voltage in the rectangular-wave control mode.

After completion of the one-map selection for each switch pair, the drive signal generator 25 works to set an output timing of the drive-signal waveform included in the one selected map for each switch pair based on the phase δ passed from the phase setter 23 (exactly, a guarded value of the phase δ by a limiter 24 described later).

Then, the drive signal generator 25 works to:

determine a pair of drive signals for each switch pair; this pair of drive signals has a corresponding one of the drive-signal waveforms included in the selected one map for each switch pair; and output, as each pair of the first drive signals gup1 and gun1, gvp1 and gvn1, and gwp1 and gwn1, the pair of drive signals for each switch pair to the selector 42 at a corresponding one output timing set thereby.

Current-Feedback Control Unit

The current-feedback control unit 30 serves as, for example, a so current-feedback adjuster. Specifically, the current feedback control unit 20 is configured to adjust the actual torque of the motor-generator 10 to the request torque Tr based on a deviation of a current parameter based on the request torque Tr from an actual value of the current parameter corresponding to the actual torque of the motor-generator 10.

Specifically, the current-feedback control unit 30 includes a command current setter 31, deviation calculators 31a and 31b, feedback control modules 32 and 33, a non-interacting control module (NON INTERACT in FIG. 2) 34, a three-phase converter 35, and a PWM signal generator (two-phase modulator) 36. The cooperative operations of the modules 31, 31a, 31b, 32, 33, 34, 35, and 36 catty out a current-feedback control task described hereinafter.

The command current setter 31 works to receive the request torque Tr inputted from the HVECU 16A. The command current setter 31 works to set a command d-axis current component idr and a command q-axis current component iqr in the d-q coordinate system of the rotor based on the request torque Tr to thereby provide, for example, the maximum torque control with minimum armature current except for the following case described later.

The deviation calculator 31a works to calculate a deviation $\Delta$id between the command d-axis current component idr and the actual d-axis current component id. The deviation calculator 31b works to calculate a deviation $\Delta$iq between the command q-axis current component iqr and the actual q-axis current component iq.

The feedback control module 32 works to set, based on the deviation $\Delta$id, a command voltage vdr' in the d-axis; this command voltage vdr' means a feedback manipulated value for d-axis current to allow the command d-axis current component idc to be matched with the measured actual d-axis current component id.

The feedback control module 32 works to set, based on the deviation $\Delta$iq, a command voltage vqr' in the q-axis; this command voltage vqr' means a feedback manipulated value for q-axis current to allow the command q-axis current component iqr to be matched with the measured actual q-axis current component iq.

Specifically, in the first embodiment, each of the feedback control modules 32 and 33 computes a corresponding one of the command voltages vdr' and vqr' using a proportional gain term and an integral gain term of a proportional integral feedback algorithm.

In the proportional integral feedback algorithm, each of the command voltages vdr' and vqr' is expressed based on the proportional gain term and integral gain term.

The proportional gain term for each of the command voltages vdr' and vqr' contributes to change in a corresponding one of the command voltages vdr' and vqr' in proportion to a corresponding one of the temporal deviations $\Delta$id and $\Delta$iq. The integral gain term is proportional to an accumulated offset of instantaneous values of each of the temporal deviations $\Delta$id and $\Delta$iq over time to reset the accumulated offset (steady-state deviation) over time to zero.

The non-interacting control module 34, which is abbreviated as "NON INTERACT" in FIG. 2, works to carry out feedforward correction of the command voltages vdr' and vqr' based on the actual d-axis and q-axis current components id and iq and the actual angular velocity $\omega$ of the motor-generator 10.

Specifically, the non-interacting control module 34 calculates a feedforward term (a feedforward manipulated value) for d-axis current based on the actual d-axis current component id and the actual angular velocity $\omega$ of the motor-generator 10. The non-interacting control module 34 also calculates a feedforward term (a feedforward manipulated value) for q-axis current based on the actual q-axis current component iq and the actual angular velocity $\omega$ of the motor-generator 10. Each of the feedforward terms for d-axis and q-axis currents works to, for example, cancel a d-q axis cross coupling term in a corresponding one of the command voltages vdr' and vqr'.

Thus, the non-interacting control module 34 corrects the command voltages vdr' and vqr' based on the calculated feedforward term to thereby generate command voltages vdr and vqr in the d-axis and q-axis of the d-q coordinate system, respectively. In other words, the sum of the feedback manipulated value for d-axis current and the feedforward manipulated value for d-axis current becomes the command voltage vdr in the d-axis of the d-q coordinate system, and the sum of the feedback manipulated value for q-axis current and the feedforward manipulated value for q-axis becomes the command voltage vqr in the q-axis of the d-q coordinate system.

The command voltages vdr and vqr in the d-axis and q-axis of the d-q coordinate system are passed to the three-phase converter 35.

The three-phase converter 35 has, for example, a map M5 in data-table format, in mathematical expression format, and/or program format. The map M5 allows the three-phase converter to calculate cosine functions.

Specifically, the three-phase converter 35 works to convert, based on the actual rotational angle $\theta$ and the map M5, the command voltages vdr and vqr in the d-q axes into a U-phase command voltage vur, a V-phase command voltage vvr, and a W-phase command voltage vwr for the respective U-, V-, and W-phase windings of the motor-generator 10. The U-, V-, and W-phase command voltages vur, vvr, and vwr correspond to, for example, substantially pseudo sinusoidal waves, respectively.

The PWM signal generator 36 works to generate, based on: the U-, V-, and W-phase command voltages vur, vvr, and vwr, the inverter input voltage VDC, and a triangular (or sawtooth) carrier wave, second drive signals gup2, gun2, gvp2, gvn2, gwp2, and gwn2. Each of the second drive signals gup2, gun2, gvp2, gvn2, gwp2, and gwn2 is a pulse signal with a controllable pulse width.

Specifically, the PWM signal generator 36 works to:

normalize each of the U-, V-, and W-phase command voltages vur, vvr, and vwr by dividing it by the inverter input voltage VDC; and compare in magnitude the normalized U-, V-, and W-phase command voltages vur, vvr, and vwr with the triangular carrier wave to thereby generate the second drive signals gup2, gun2, gvp2, gvn2, gwp2, and gwn2.

The generated second drive signals gup2, gun2, gvp2, gvn2, gwp2, and gwn2 are transferred to the selector 42.

Fail-Safe Task

The selector 42 serves as, for example, an output unit. The selector 42 is configured to select:

the first group of the first drive signals gup1, gun1, gvp1, gvn1, gwp1, and gwn1 in a torque feedback mode in which the torque-feedback control unit 20 carries out the torque-feedback control task set forth above to thereby adjust the actual torque of the motor-generator 10 to the request torque Tr, and the second group of the second drive signals gup2, gun2, gvp2, gvn2, gwp2, and gwn2 in a current feedback mode in which the current-feedback control unit 30 carries out the current-feedback control task set forth above to thereby adjust the actual torque of the motor-generator 10 to the request torque Tr.

The selector 42 is designed to select the second group of the second drive signals gup2, gun2, gvp2, gvn2, gwp2, and gwn2 in the current feedback mode only when the torque-feedback control unit 20 cannot accurately carry out the torque-feedback control task because it cannot use an accurate correction value $\Delta\theta$ due to, for example, a fault in the non-volatile memory 14b. This is because, if the torque-feedback control unit 20 cannot use the accurate correction value $\Delta\theta$, the phase $\delta$ may become out of a tolerable range from a preset upper limit for the phase $\delta$ in phase-lead direction to a preset lower limit therefor in phase-retard direction predetermined in the torque feedback mode.

Figure 3:
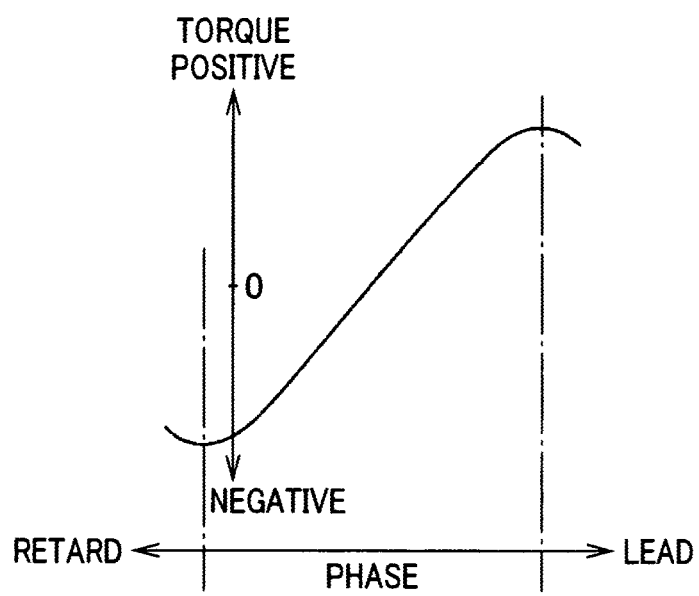
FIG. 3 is a graph schematically illustrating a relationship between an actual torque of a motor-generator illustrated in FIG. 1 and a phase of an output voltage vector of an inverter illustrated in FIG. 1.

Specifically, referring to FIG. 3, the phase $\delta$ of the output voltage vector of the inverter IV and the actual torque of the motor-generator 10 have a one-to-one correspondence therebetween as long as the phase $\delta$ is within the tolerable range. In other words, if the phase $\delta$ is out of the tolerable range, there are plural values of the phase $\delta$ of the output voltage vector of the inverter IV, which can generate a same value of the actual torque of the motor-generator 10.

For this reason, as described above, the limiter 24 sets a phase manipulatable range to the tolerable range to thereby limit a value of the phase $\delta$ of the output voltage vector of the inverter IV within the phase manipulatable range.

However, when the torque-feedback control unit 20 cannot use the accurate correction value $\Delta\theta$, even if the phase $\delta$ is within the phase controllable range, the actual phase of the output voltage of the inverter IV may be out of the phase controllable range. Particularly, because the correction value $\Delta\theta$ may become 10 degrees or thereabout, this "out of phase" problem may become sever.

In view of the circumstances set forth above, the current-feedback control unit 30 according to this embodiment is configured to perform the fail-safe task. Note that the current-feedback control unit 30 uses, as the rotational angle of the rotor, the sum of the rotational angle $\theta$ measured by the rotational angle sensor 15 and the correction value $\Delta\theta$. Thus, the phase $\delta$ varies depending on whether or not the current-feedback control unit 30 uses the accurate correction value $\Delta\theta$.

However, because the current-feedback control unit 30 adjusts each of the actual d-axis and q-axis current components id and iq to a corresponding one of the command d-axis and q-axis current components idr and iqr in a corresponding feedback loop, even if there is an offset between each of the actual d-axis and q-axis current components id and iq and a corresponding one of the command d-axis and q-axis current components idr and iqr, it is possible to prevent the occurrence of a failure in adjustment of the actual torque of the motor-generator 10 to the request torque Tr.

Figure 4:
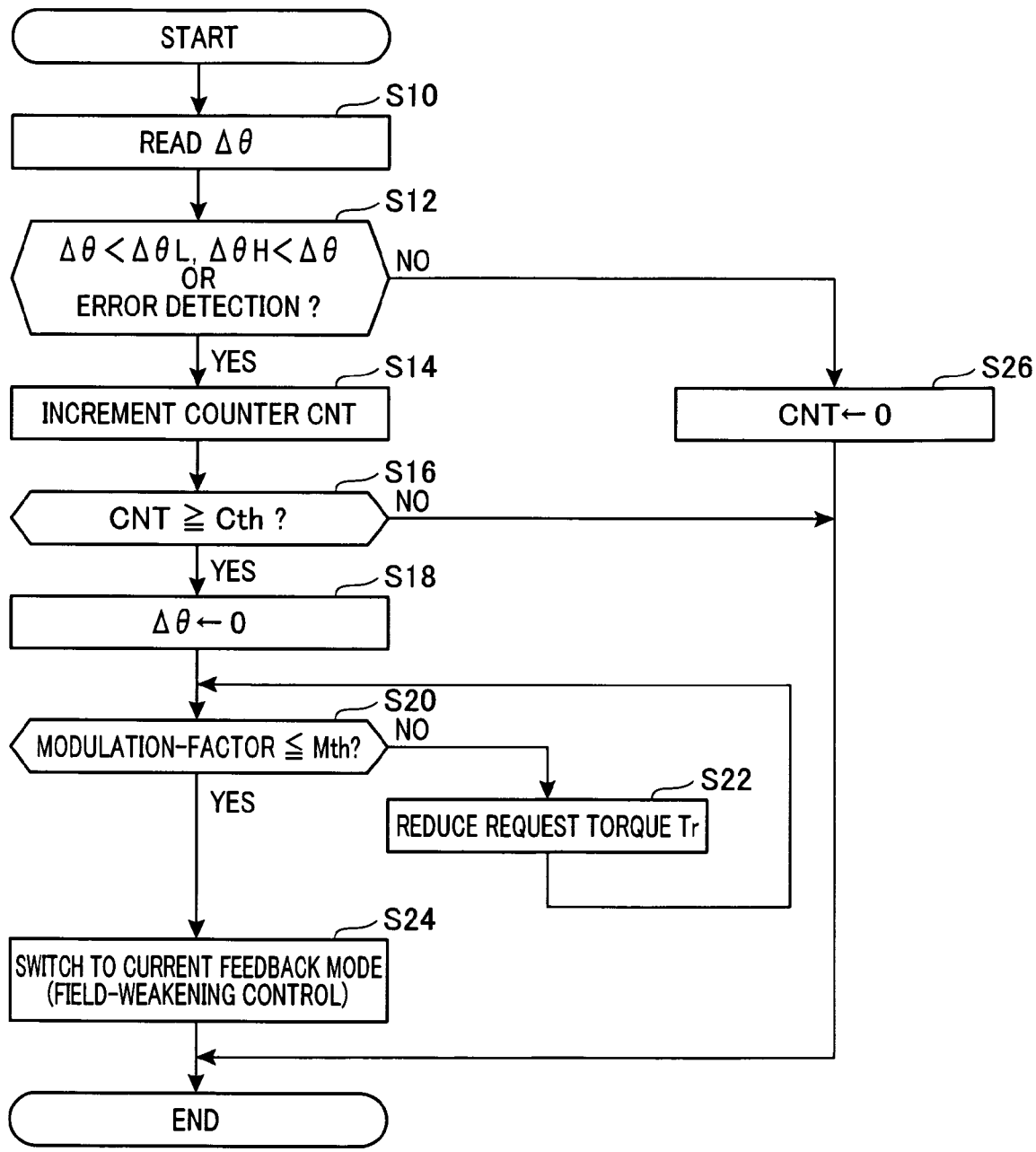
FIG. 4 is a flowchart schematically illustrating a fail-safe task to be executed by the MGECU according to the first embodiment.

FIG. 4 schematically illustrates the fail-safe task to be executed by the CPU 14a of the MGECU 14. The fail-safe task is, for example, programmed in the MGECU 14 to be repeatedly executed thereby at a preset cycle.

Starting the fail-safe task, the CPU 14a reads the correction value $\Delta\theta$ stored in the nonvolatile memory 14b in step S10, and determines whether there is an abnormality in the correction value $\Delta\theta$ in step S12. For example, in step S12, the CPU 14a determines that there is an abnormality in the correction value $\Delta\theta$ when the correction value $\Delta\theta$ is either lower than an expected lower limit $\Delta\theta L$ or higher than an expected higher limit $\Delta\theta H$. As another example, in step S12, if the correction value $\Delta\theta$ includes an error detection code, the CPU 14a can determine whether there is an abnormality in the correction value $\Delta\theta$ based on the error detection code.

When determining that there is an abnormality in the correction value $\Delta\theta$ (YES in step S12), the CPU 14a increments a provisionally abnormal counter CNT in the form of software or hardware in step S14; the provisionally abnormal counter CNT is used to detect there is a provisional abnormality in the correction value $\Delta\theta$. An initial value of the counter CNT is set to zero.

Next, the CPU 14a determines whether the counter CNT is equal to or higher than a threshold Cth; the threshold Cth is set to be higher than 1 in step S16. These operations in steps S14 and S16 are to determine whether there is an abnormality to disable using the accurate correction value $\Delta\theta$ with high accuracy.

When determining that the counter CNT is equal to or higher than the threshold Cth (YES in step S16), the CPU 14a determines that there is an abnormality to disable using the accurate correction value $\Delta\theta$, then bring the correction value $\Delta\theta$ to zero in step S18. This causes the rotational angle $\theta$ measured by the rotational angle sensor 15 to be directly used for adjustment of the actual torque of the motor-generator 10 to the request torque Tr.

Following the operation in step S18, the CPU 14a determines whether the modulation factor for the current-feedback control unit 30 to control the actual torque of the motor-generator 10 is equal to or smaller than a switching threshold Mth in step S20. This operation in step S20 is to determine whether there is timing to switch the torque feedback control by the torque-feedback control unit 20 to the current feedback control by the current-feedback control unit 30. As the switching threshold Mth, an upper limit of the modulation factor is set; the upper limit of the modulation factor is a limit up to which the reduction in the controllability of the current-feedback control unit 30 is expected to be prevented. Specifically, the upper limit of the modulation factor is set to 1.15 at which the peak-to-peak of the pseudo sinusoidal output voltage of the inverter IV is equal to the inverter input voltage VDC. The upper limit of 1.15 of the modulation factor can be converted into the voltage utilization factor of 0.71. The modulation factor when the current-feedback control unit 30 controls the actual torque of the motor-generator 10 can be simply calculated based on the noun of the actual output voltage vector of the inverter IV and the inverter input voltage VDC. For more exactly calculating the modulation factor when the current-feedback control unit 30 controls the actual torque of the motor-generator 10, the CPU 14a can calculate, based on the instantaneous U-, V-, and W-phase alternating currents iu, iv, and iw actually flowing through the respective U-, V-, and W-phase windings, the modulation factor required to cause these armature currents iu, iv, and iw to flow through the respective U-, V-, and W-phase windings.

When determining that the modulation factor is greater than the switching threshold Mth (NO in step S20), the CPU 14a determines that switching from the torque feedback mode to the current feedback mode may reduce the controllability of the current-feedback control unit 30. Then, the CPU 14a proceeds to step S22, and reduces the request torque Tr in step S22 to continue adjustment of the actual torque of the motor-generator 10 to the request torque Tr in the torque feedback mode, returning to step S20. That is, the CPU 14a continues adjustment of the actual torque of the motor-generator 10 to the request torque Tr by the torque-feedback control unit 20 until the modulation factor exceeds the switching threshold Mth (NO in step S20) even if there is that there is an abnormality to disable using the accurate correction value Δθ (YES in step S12).

Otherwise, when determining that the modulation factor is equal to or smaller than the switching threshold Mth (YES in step S20), the CPU 14a determines that switching from the torque feedback mode to the current feedback mode cannot reduce the controllability of the current-feedback control unit 30. Then, the CPU 14a proceeds to step S24, and switches from the torque feedback mode to the current feedback mode by selecting the second drive signals gup2, gun2, gvp2, gvn2, gwp2, and gwn2 in place of the first drive signals gup1, gun1, gvp1, gvn1, gwp1, and gwn1 in step S24.

In step S24, when the modulation factor is substantially equal to the switching threshold Mth, the CPU 14a, preferably changes values of the command d- and q-axis current components idr and iqr, which are required to carry out the maximum torque control to obtain the maximum torque with minimum armature current, to values of the command d- and q-axis current components idr and iqr, which are required to carry out field-weakening control. For example, the values of the command d- and q-axis current components idr and iqr, which are required to carry out field-weakening control, are determined such that the value of the command d-axis current component idr is a given negative value to reduce the field flux of the motor-generator 10. This configuration to perform both the maximum torque control to obtain the maximum torque with minimum armature current, and the field-weakening control increases an armature-current region used by the current-feedback control unit 30 in comparison to when performing only the maximum torque control to obtain the maximum torque with minimum armature current.

Note that, in step S20, it is undesirable to calculate the modulation factor required to cause armature current, which have been determined to flow through armature winding of the motor generator 10 in the torque feedback mode, to flow through armature winding of the motor-generator 10 in the current feedback mode. For this reason, in step S20, it is preferable for the CPU 14a to calculate the modulation factor required for the current-feedback control unit 30 to adjust the actual torque of the motor-generator 10 to the request torque Tr.

On the other hand, when determining that there is not an abnormality in the correction value Δθ (NO in step S12), the CPU 14a proceeds to step S26, and resets the counter CNT to zero in step S26. After completion of the operation in each of steps S24 and S26, the CPU 14a terminates the fail-safe task, and waits for the next cycle. Similarly, when determining that the counter CNT is lower than the threshold Cth (NO in step S16), the CPU 14a terminates the fail-safe task, and waits for the next cycle.

For example, the operations in steps S12 to S20 of the CPU 14a serve as, for example, an abnormality determiner, and the operations in steps S22 and S24 of the CPU 14a serve as, for example, a limiter. Particularly, the operation in step S22 serves as, for example, a modulation-factor reducer.

As described above, when determining that the modulation factor is greater than the switching threshold Mth (NO in step S20), the CPU 14a continues adjustment of the actual torque of the motor-generator 10 to the request torque Tr by the torque-feedback control unit 20 while reducing the request torque Tr until the modulation factor exceeds the switching threshold Mth in step S22. In comparison to when the CPU 14a continues adjustment of the actual torque of the motor-generator 10 to the request torque Tr by the torque-feedback control unit 20 while keeping the request torque Tr, the operation in step S22 causes hard the occurrence of failure in the torque feedback control.

As described above, the control system 50 for the motor-generator 10 is configured to switch from the torque feedback mode to adjust the actual torque of the motor-generator 10 to the request torque Tr to the current feedback mode to adjust the actual torque of the motor-generator 10 to the request torque Tr when determining that it is disabled to perform the torque adjustment using the accurate correction value Δθ. This configuration achieves the first advantage of executing the fail-safe task upon the occurrence of an abnormality in the correction value Δθ, thus preventing the occurrence of a failure in adjustment of the actual torque of the three-phase motor to the request torque Tr.

The control system 50 is also configured to switch from the torque feedback mode to adjust the actual torque of the motor-generator 10 to the request torque Tr to the current feedback mode when the modulation factor of the inverter IV is equal to or smaller than the switching threshold Mth. The switching threshold Mth represents the upper limit of the modulation factor up to which the reduction in the controllability of the current-feedback control unit 30 is expected to be prevented. This configuration achieves the second advantage of preventing the reduction in the controllability of the current-feedback control unit 30 after the switching.

The control system 50 is further configured to reduce the request torque Tr to thereby reduce the modulation factor of the inverter IV when determining that it is disabled to perform the torque adjustment using the accurate correction value Δθ. This achieves the third advantage of making earlier switching from the torque feedback mode to the current feedback mode.

The control system 50 is configured to perform both the maximum torque control to obtain the maximum torque with minimum armature current, and the field-weakening control after the switching under predetermined conditions. This configuration achieves the fourth effect of increasing an armature-current region used by the current-feedback control unit 30 in comparison to when performing only the maximum torque control to obtain the maximum torque with minimum armature current.

In addition, the control system 50 is configured to determine that there is an abnormality to disable using the accurate correction value Δθ by determining that the counter CNT is equal to or higher than the threshold Cth. This configuration achieves the fifth effect of improving accuracy of determining abnormalities.

Second Embodiment

A control system for the motor-generator 10 according to the second embodiment of the present disclosure will be described with reference to FIG. 5.

The structure and/or functions of the control system according to the second embodiment are different from the control system 50 by the following points. So, the different points will be mainly described hereinafter.

Figure 5:
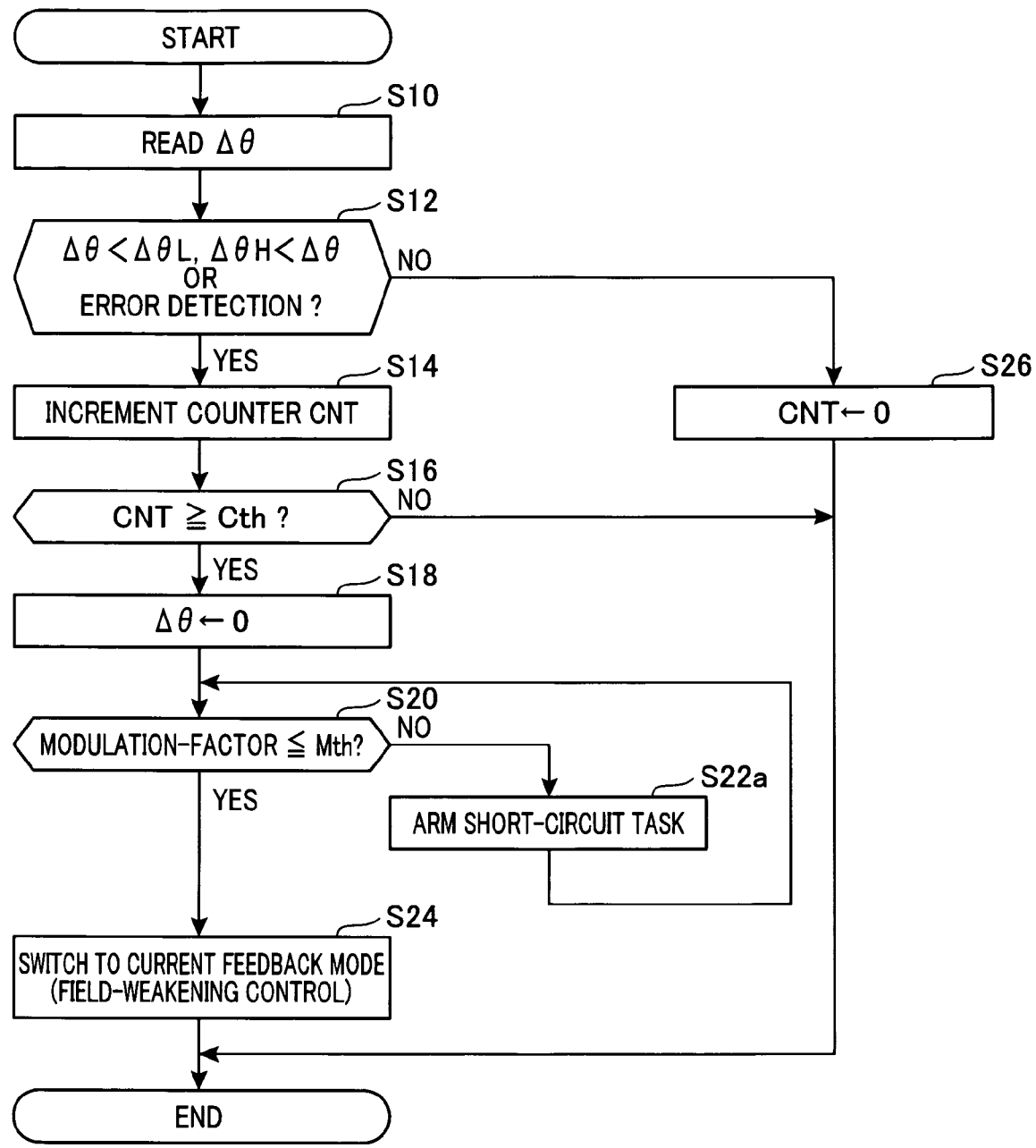
FIG. 5 is a flowchart schematically illustrating a fail-safe task to be executed by the MGECU according to the second embodiment of the present disclosure.

FIG. 5 schematically illustrates a fail-safe task to be executed by the CPU 14a of the MGECU 14 according to the second embodiment. The fail-safe task is, for example, programmed in the MGECU 14 to be repeatedly executed thereby at a preset cycle. In the fail-safe task illustrated in FIG. 4 and that illustrated in FIG. 5, like operations (steps) therebetween, to which like reference step numbers are assigned, are omitted or simplified in redundant description.

The CPU 14a performs the operations in steps S10 to S20 set forth above. When determining that the modulation factor is greater than the switching threshold Mth (NO in step S20), the CPU 14a performs an arm short-circuit task to turn on all the upper-arm switching elements Sup, Svp, and Swp or all the lower-arm switching elements Sun, Svn, and Swn in step S22a. The arm short-circuit task causes the input of the motor-generator 10 to be short-circuited, resulting in that load torque is generated in the motor-generator 10. The load torque causes kinetic energy of the motor-generator 10 to be consumed as thermal energy by the inverter IV, reducing the rotational speed of the motor-generator 10. The reduction in the rotational speed of the motor-generator 10 allows induced voltage in the motor-generator 10 to be reduced. The reduction in the induced voltage in the motor-generator 10 allows the modulation factor required for the current feedback mode to be reduced.

The operation in step S22a of the CPU 14a serves as, for example, a modulation factor reducer.

Accordingly, the configuration of the control system according to the second embodiment makes earlier switching from the torque feedback mode to the current feedback mode, thus achieving the first to fifth advantages as well as the control system 50 according to the first embodiment.

Third Embodiment

A control system for the motor-generator 10 according to the third embodiment of the present disclosure will be described with reference to FIG. 6.

The structure and/or functions of the control system according to the third embodiment are different from the control system 50 by the following points. So, the different points will be mainly described hereinafter.

Figure 6:
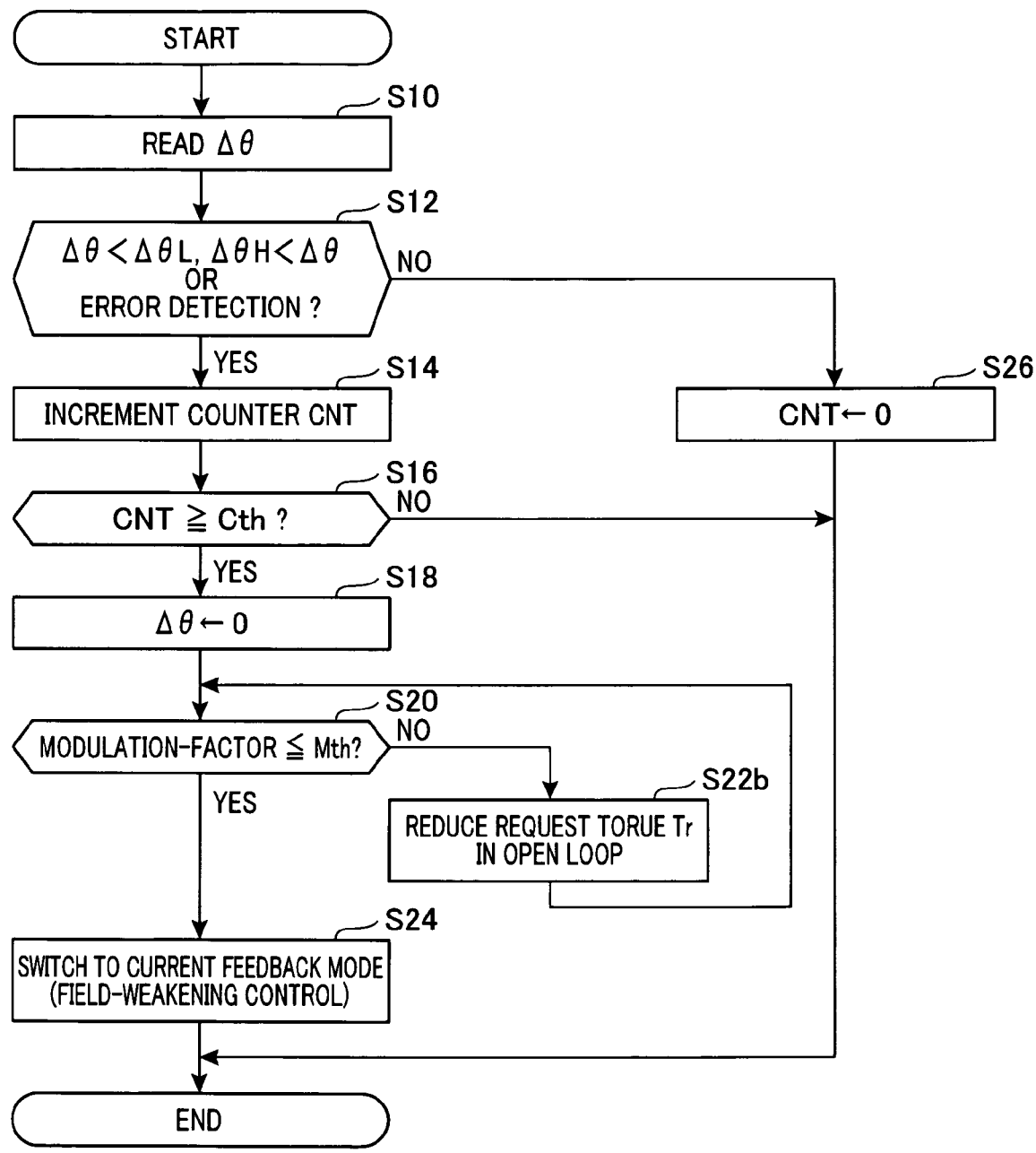
FIG. 6 is a flowchart schematically illustrating a fail-safe task to be executed by the MGECU according to the third embodiment of the present disclosure.

FIG. 6 schematically illustrates a fail-safe task to be executed by the CPU 14a of the MGECU 14 according to the third embodiment. The fail-safe task is, for example, programmed in the MGECU 14 to be repeatedly executed thereby at a preset cycle. In the fail-safe task illustrated in FIG. 4 and that illustrated in FIG. 6, like operations (steps) therebetween, to which like reference step numbers are assigned, are omitted or simplified in redundant description.

The CPU 14a performs the operations in steps S10 to S20 set forth above. When determining that the modulation factor is greater than the switching threshold Mth (NO in step S20), the CPU 14a sets the phase δ, as an input parameter to the drive signal generator 25 of the torque-feedback control unit 20, to a fixed value in place of the value of the phase δ set by the phase setter 23 in step S22b. Because the torque feedback loop of the torque feedback mode is set for determining the phase δ of the output voltage vector of the inverter IV, and the norm Vn of the output voltage vector of the inverter IV is determined based on the open-loop control using the request torque Tr, the CPU 14a continues adjustment of the actual torque of the motor-generator 10 to the request torque Tr in the open loop control using the request torque Tr with the phase δ being constant. The operation in step S22b serves as, for example, a modulation-factor reducer.

This configuration of the control system according to the third embodiment prevents execution of the torque feedback control with the phase δ being out of the tolerable range (phase manipulatable range).

Note that, preferably, the CPU 14a continues adjustment of the actual torque of the motor-generator 10 to the request torque Tr in the torque feedback mode with the phase δ being constant while reducing the request torque Tr in step S22b.

Accordingly, the configuration of the control system according to the third embodiment achieves the first to fifth advantages as well as the control system 50 according to the first embodiment.

Fourth Embodiment

A control system for the motor-generator 10 according to the fourth embodiment of the present disclosure will be described with reference to FIG. 7.

The structure and/or functions of the control system according to the fourth embodiment are different from the control system 50 by the following points. So, the different points will be mainly described hereinafter.

The CPU 14a according to the fourth embodiment is configured to perform, as the fail-safe task, a task to limit manipulation of the phase δ in the torque feedback mode in place of adjustment of the actual torque to the request torque Tr in the current feedback mode.

Figure 7:
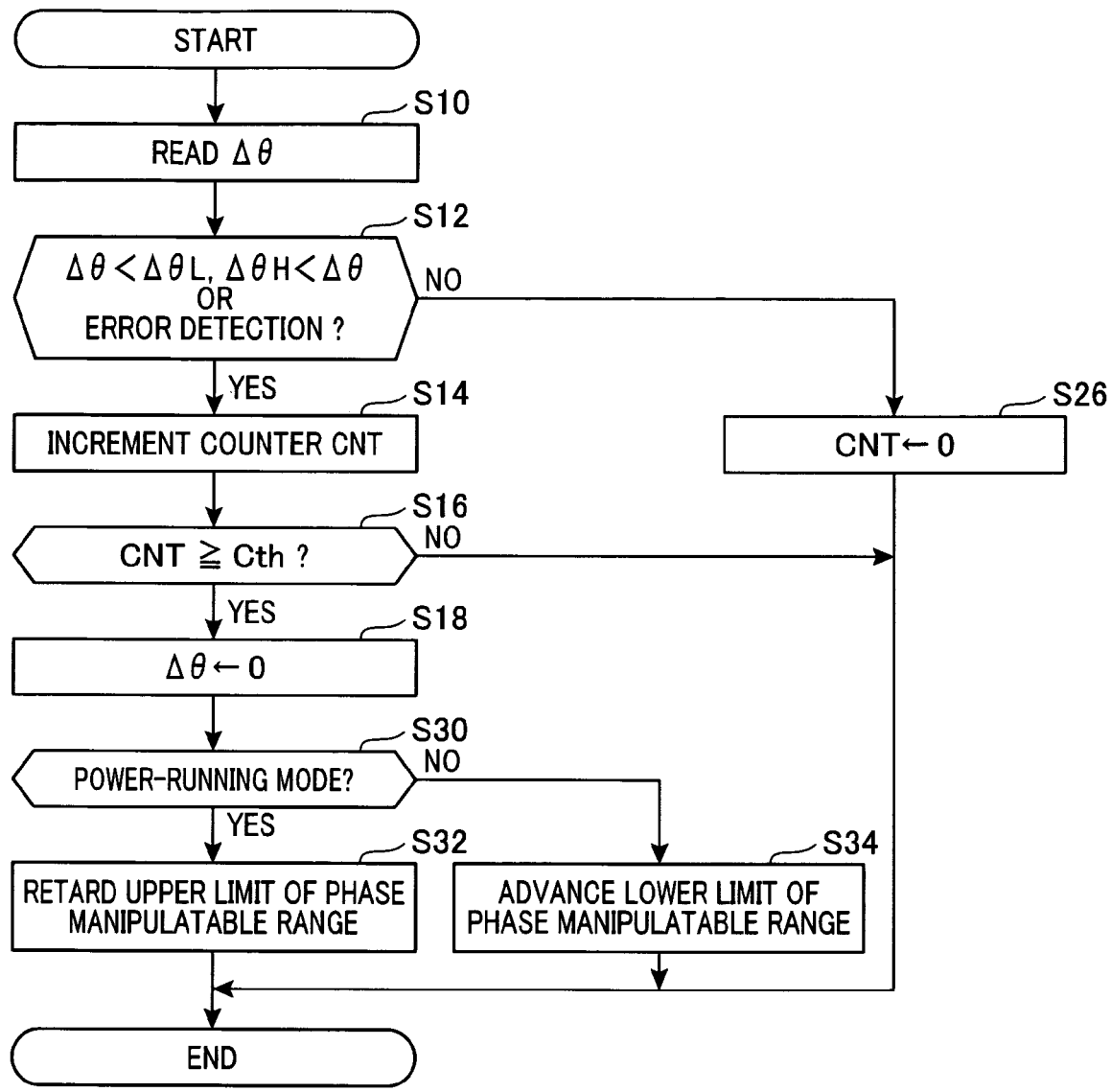
FIG. 7 is a flowchart schematically illustrating a fail-safe task to be executed by the MGECU according to the fourth embodiment of the present disclosure.

FIG. 7 schematically illustrates a fail-safe task to be executed by the CPU 14a of the MGECU 14 according to the fourth embodiment. The fail-safe task is, for example, programmed in the MGECU 14 to be repeatedly executed thereby at a preset cycle. In the fail-safe task illustrated in FIG. 4 and that illustrated in FIG. 7, like operations (steps) therebetween, to which like reference step numbers are assigned, are omitted or simplified in redundant description.

The CPU 14a performs the operations in steps S10 to S18 set forth above. After completion of the operation in step S18, the CPU 14a determines whether the control system 50 operates in the power-running control mode in step S30. The determination in step S30 is to determine whether the guard zone for the phase δ in the phase-lead direction within the phase manipulatable range (tolerable range) is retarded or the guard zone for the phase δ in the phase-retard direction within the phase manipulatable range (tolerable range) is advanced.

Specifically, as illustrated in FIG. 3, when the control system 50 operates in the power-running mode with the actual torque of the motor-generator 10 being positive, there is a guard zone in the phase-lead direction within the phase manipulatable range. When the control system 50 operates in the regenerative control mode with the actual torque of the motor-generator 10 being negative, there is a guard zone in the phase-retard direction within the phase manipulatable range.

For this reason, when determining that the control system 50 operates in the power-running control mode (YES in step S30), the CPU 14a retards the upper limit of the phase manipulatable range, thus reducing the phase manipulatable range in step S32.

Otherwise, when determining that the control system 50 operates in the regenerative control mode (NO in step S30), the CPU 14a advances the lower limit of the phase manipulatable range, thus reducing the phase manipulatable range in step S34.

Note that the amount of correction for the retard of the upper limit of the phase manipulatable range can be preferably set to be equal to or higher than an expected maximum value of the correction value Δθ in the phase-advance direction. Similarly, the amount of correction for the advance of the lower limit of the phase manipulatable range can be preferably set to be equal to or higher than an expected maximum value of the correction value Δθ in the phase-retard direction. That is, because the phase manipulated range is determined for the corrected phase δ' by the correction value Δθ, the upper limit of the phase manipulated range for the phase δ uncorrected by the correction value Δθ can be preferably retarded by the expected maximum value of the correction value Δθ in the phase-advance direction. For the same reason, the lower limit of the phase manipulated range for the phase δ uncorrected by the correction value Δθ can be preferably advanced by the expected maximum value of the correction value Δθ in the phase-retard direction. After completion of the operation in either step S32 or S34, the CPU 14a terminates the fail-safe task, and waits for the next cycle.

As described above, the control system according to the fourth embodiment is configured to reduce the phase manipulatable range in the torque feedback mode if there is an abnormality to disable using the accurate correction value Δθ. This configuration of the control system according to the fourth embodiment achieves, in addition to the first advantage, the sixth advantage of preventing the phase δ of the output voltage vector of the inverter IV, which is uncorrected by the correction value Δθ, from being out of a range within which the uncorrected phase δ of the output voltage vector of the inverter IV and the actual torque of the motor-generator 10 have a one-to-one correspondence therebetween.

Fifth Embodiment

A control system for the motor-generator 10 according to the fifth embodiment of the present disclosure will be described with reference to FIG. 8.

The structure and/or functions of the control system according to the fifth embodiment are different from the control system 50 by the following points. So, the different points will be mainly described hereinafter.

The CPU 14a according to the fifth embodiment is configured to perform, as the fail-safe task, a task to limit manipulation of the phase δ in the torque feedback mode in place of adjustment of the actual torque to the request torque Tr in the current feedback mode.

Figure 8:
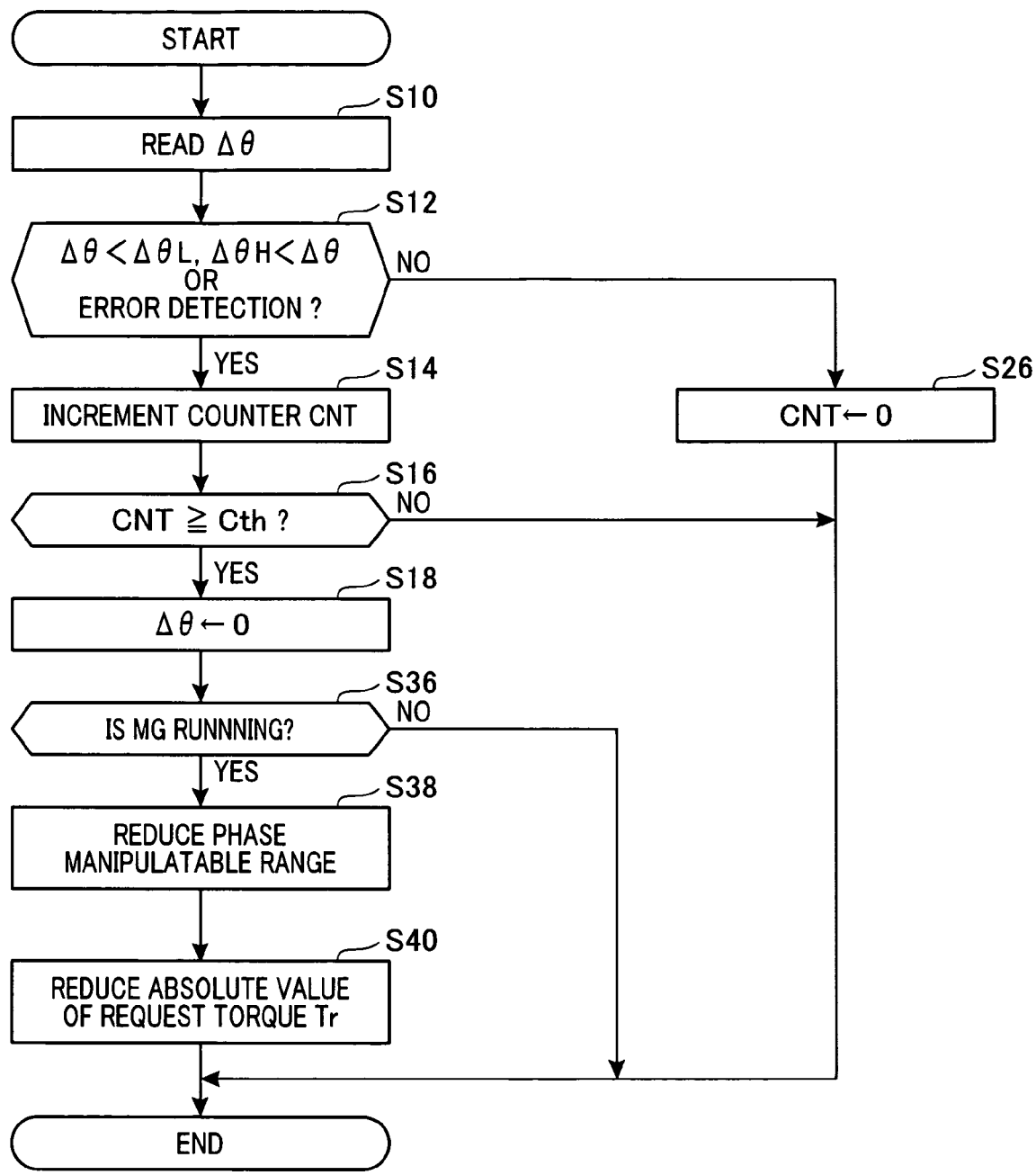
FIG. 8 is a flowchart schematically illustrating a fail-safe task to be executed by the MGECU according to the fifth embodiment of the present disclosure.

FIG. 8 schematically illustrates a fail-safe task to be executed by the CPU 14a of the MGECU 14 according to the fifth embodiment. The fail-safe task is, for example, programmed in the MGECU 14 to be repeatedly executed thereby at a preset cycle. In the fail-safe task illustrated in FIG. 4 and that illustrated in FIG. 8, like operations (steps) therebetween, to which like reference step numbers are assigned, are omitted or simplified in redundant description.

The CPU 14a, performs the operations in steps S10 to S18 set forth above. After completion of the operation in step S18, the CPU 14a determines whether the motor-generator (MG) 10 is running in step S36.

When determining that the motor-generator (MG) 10 is running (YES in step S36), the CPU 14a reduces the phase manipulatable range in step S38. Next, the CPU 14a reduces an absolute value of the request torque Tr to be equal to or lower than a preset value in step S40. For example, in step S40, the CPU 14a brings the absolute value of the request torque Tr to zero.

The operation in step S40 is to accurately maintain the controllability for the actual torque of the motor-generator 10 even if the phase manipulatable range is reduced. Specifically, when the absolute value of the request torque Tr is a lower value, a proper value of the phase δ for the power-running control mode is shifted to the retard side opposite to the upper limit of the phase manipulatable range, and a proper value of the phase δ for the regenerative control mode is shifted to the lead side opposite to the lower limit of the phase manipulatable range in comparison to when the request torque Tr is a higher value. For this reason, the operation in step S40 restricts a proper value of the phase δ required to adjust the actual torque of the motor-generator 10 to the request torque Tr from approaching the upper or lower limit of the phase allowable range. This makes it possible to properly control the actual torque of the motor-generator 10 within the downsized phase manipulatable range.

As described above, the control system according to the fifth embodiment is configured to limit manipulation of the request torque Tr in addition to the limitation of manipulation of the phase δ. This configuration of the control system according to the fifth embodiment achieves, in addition to the sixth advantage, the seventh advantage of adjusting the actual torque of the motor-generator 10 to the request torque Tr even if manipulation of the phase δ is limited.

Sixth Embodiment

A control system for the motor-generator 10 according to the sixth embodiment of the present disclosure will be described with reference to FIG. 9.

The structure and/or functions of the control system according to the sixth embodiment are different from the control system 50 by the following points. So, the different points will be mainly described hereinafter.

Figure 9:
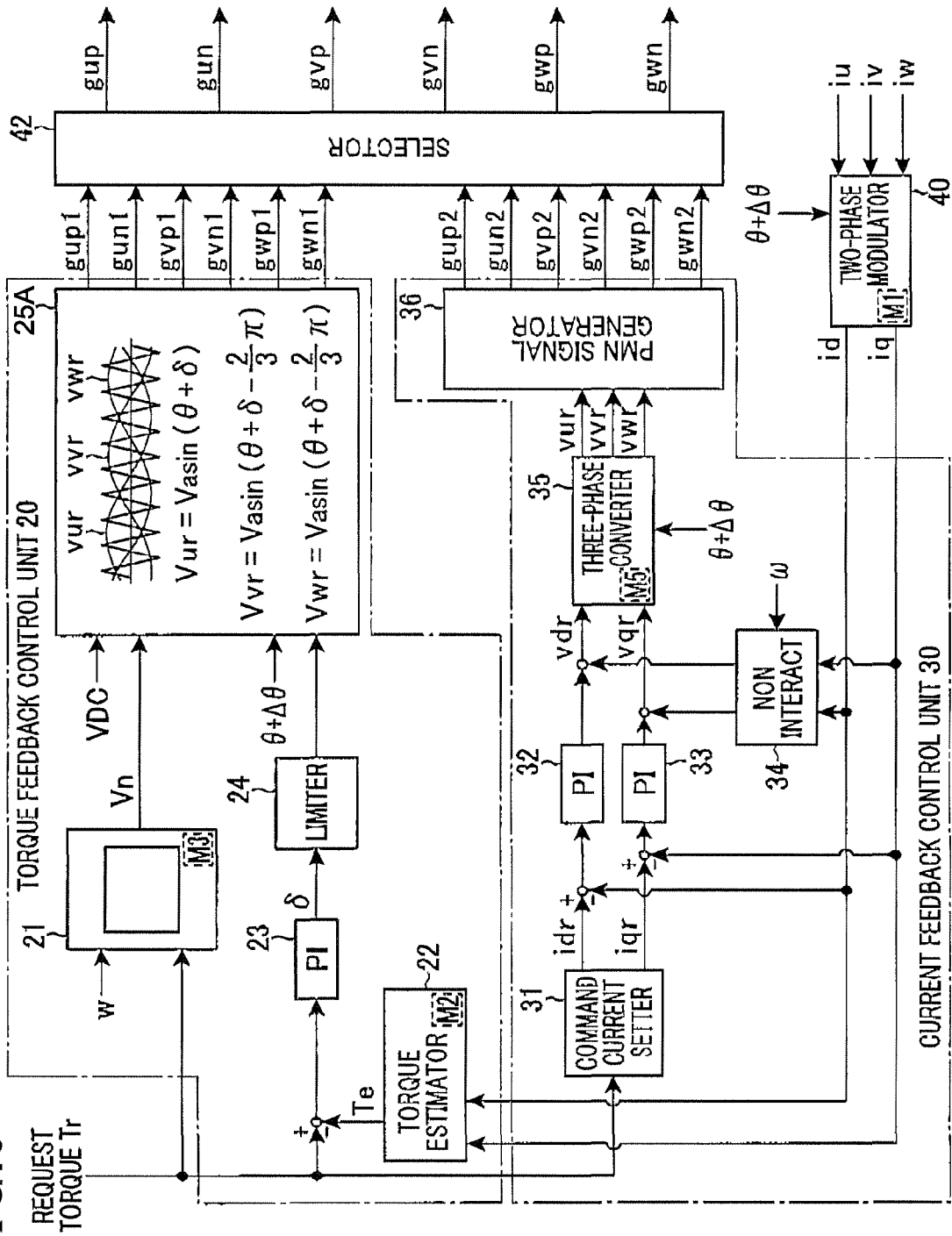
FIG. 9 is a block diagram schematically illustrating functional modules of a MGECU equivalent to tasks to be executed thereby according to the sixth embodiment of the present disclosure.

FIG. 9 schematically illustrates functional modules of the MGECU 14 equivalent to tasks to be executed by the MGECU 14 according to the sixth embodiment. In FIGS. 2 and 9, like elements therebetween, to which like reference numerals are assigned, are omitted or simplified in redundant description.

Referring to FIG. 9, a drive signal generator 25A according to the sixth embodiment works to set, based on the norm Vn, the phase δ (exactly, a guarded value of the phase δ by the limiter 24), and the rotational angle θ (θ+Δθ), U-, V-, and W-phase command voltages vur, vvr, and vwr for the respective U-, V-, and W-phase windings of the motor-generator 10. For example, when an amplitude of each of the U-, V-, and W-phase command voltages vur, vvr, and vwr, which is determined based on the norm Vn, is represented as Vα, the U-, V-, and W-phase command voltages vur, vvr, and vwr are represented as follows:

$$Vur = V\alpha \sin(\theta + \delta)$$
$$Vvr = V\alpha \sin\left(\theta + \delta - \frac{2}{3}\pi\right)$$
$$Vwr = V\alpha \sin\left(\theta + \delta + \frac{2}{3}\pi\right)$$

That is, each of the U-, V-, and W-phase command voltages vur, vvr, and vwr is a sinusoidal wave having a phase defined by the phase δ and a period identical to the phase of the rotational angle θ.

In addition, the drive signal generator 25A works to generate, based on: the U-, V-, and W-phase command voltages vur, vvr, and vwr, the inverter input voltage VDC, and a triangular (or saw-tooth) carrier wave, first drive signals gup1, gun1, gvp1, gvn1, gwp1, and gwn1 such that the output voltages of the inverter IV are the U-, V-, and W-phase command voltages vur, vvr, and vwr.

Specifically, the drive signal generator 25A works to:
normalize each of the U-, V-, and W-phase command voltages vur, vvr, and vwr by dividing it by the inverter input voltage VDC; and
compare in magnitude the normalized U-, V-, and W-phase command voltages vur, vvr, and vwr with the triangular carrier wave to thereby generate the first drive signals gup1, gun1, gvp1, gvn1, gwp1, and gwn2.

The generated first drive signals gup1, gun1, gvp1, gvn1, gwp1, and gwn1 are transferred to the selector 42.

The control system according to the sixth embodiment is configured to switch from the torque feedback mode to adjust the actual torque of the motor-generator 10 to the request torque Tr to the current feedback mode to adjust the actual torque of the motor-generator 10 to the request torque Tr when determining that it is disabled to perform the torque adjustment using the accurate correction value $\Delta\theta$. Thus, the control system according to the sixth embodiment achieves the first to fifth advantages set forth above.

Seventh Embodiment

A control system for the motor-generator 10 according to the seventh embodiment of the present disclosure will be described with reference to FIGS. 10 and 11.

The structure and/or functions of the control system according to the seventh embodiment are different from the control system 50 by the following points. So, the different points will be mainly described hereinafter.

Figure 10:
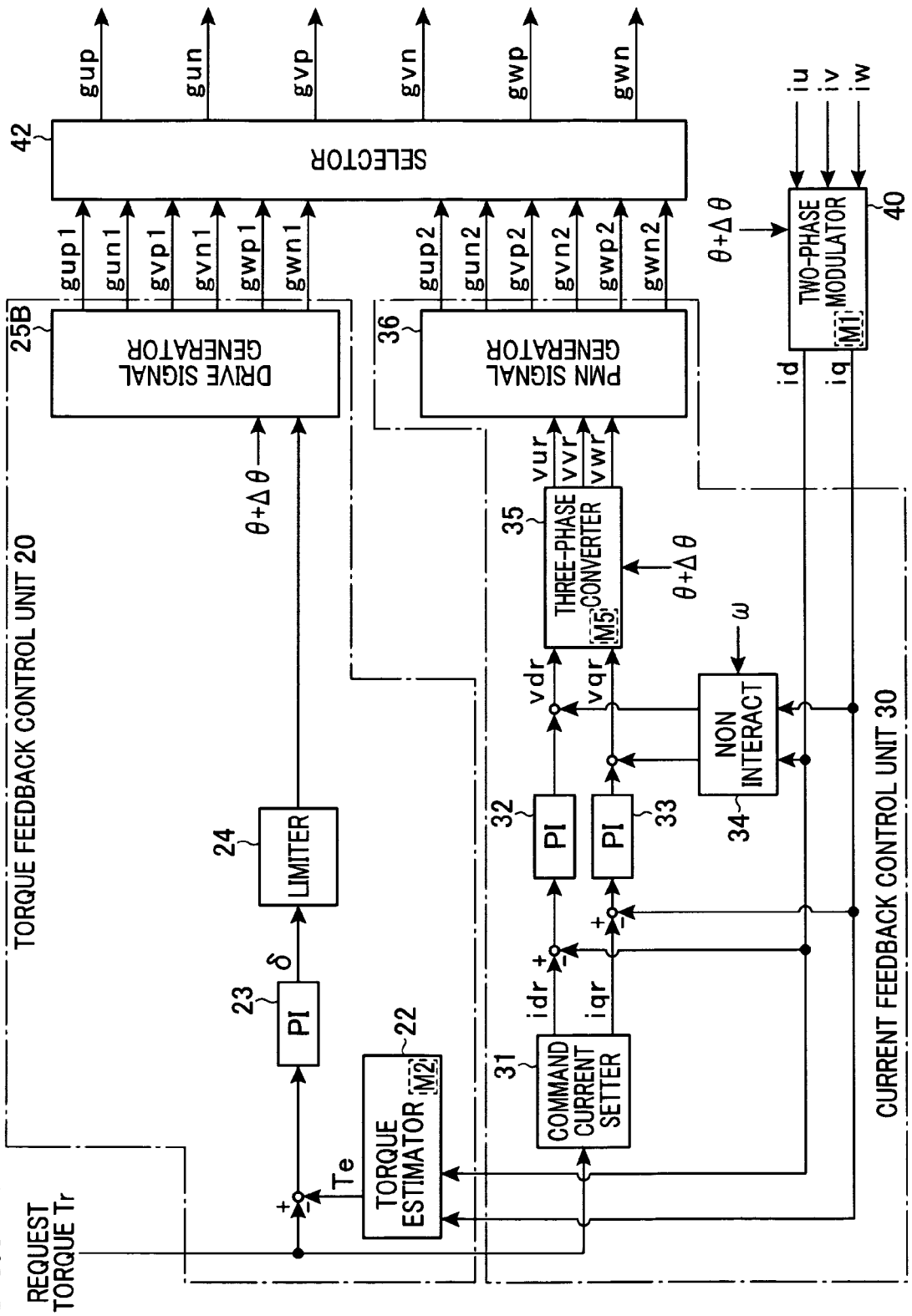
FIG. 10 is a block diagram schematically illustrating functional modules of a MGECU equivalent to tasks to be executed thereby according to the seventh embodiment of the present disclosure.

FIG. 10 schematically illustrates functional modules of the MGECU 14 equivalent to tasks to be executed by the MGECU 14 according to the sixth embodiment. In FIGS. 2 and 10, like elements therebetween, to which like reference numerals are assigned, are omitted or simplified in redundant description.

Referring to FIG. 10, the torque-feedback control unit 20 is configured to operate in the rectangular-wave control mode. In the rectangular-wave control mode, a drive signal generator 25B of the torque-feedback control unit 20 performs a rectangular-wave control task. In addition, in the rectangular-wave control mode, the selector 42 selects the second drive signals gup2, gun2, gvp2, gvn2, gwp2, and gwn2 in place of the first drive signals gup1, gun1, gvp1, gun1, gwp1, and gwn1 when the modulation factor of the inverter IV is equal to or smaller than the switching threshold Mth.

In the rectangular-wave control mode, the drive signal generator 253 generates, based on the phase $\delta$ (exactly, a guarded value of the phase $\delta$ by the limiter 24), and the rotational angle $\theta$ ($\theta+\Delta\theta$), the first drive signals gup1, gun1, gvp1, gvn1, gwp1, and gwn1 such that an on duration of one of the high- and low-side switching elements of each pair is substantially matched with one half of a corresponding period of a periodic command voltage (an output voltage) of the inverter IV, and an on duration of the other thereof is substantially matched with the remaining half of the corresponding period of the periodic command voltage (an output voltage) of the inverter IV.

In other words, each of the switching elements Sup, Sun, Svp, Svn, Swp, and Swn of the inverter IV is individually switched on and off such that the on and off period of each pair of the switching elements Sup, Sun, Svp, Svn, Swp, and Swn is substantially matched with one period of a periodic command voltage (an output voltage) of the inverter IV; the one period corresponds to an electric angle of $2\pi$ radians.

The selector 42 also selects the first drive signals gup1, gun1, gvp1, gvn1, gwp1, and gwn1 in place of the second drive signals gup2, gun2, gvp2, gvn2, gwp2, and gwn2 when the modulation factor of the inverter IV is greater than the switching threshold Mth.

Figure 11:
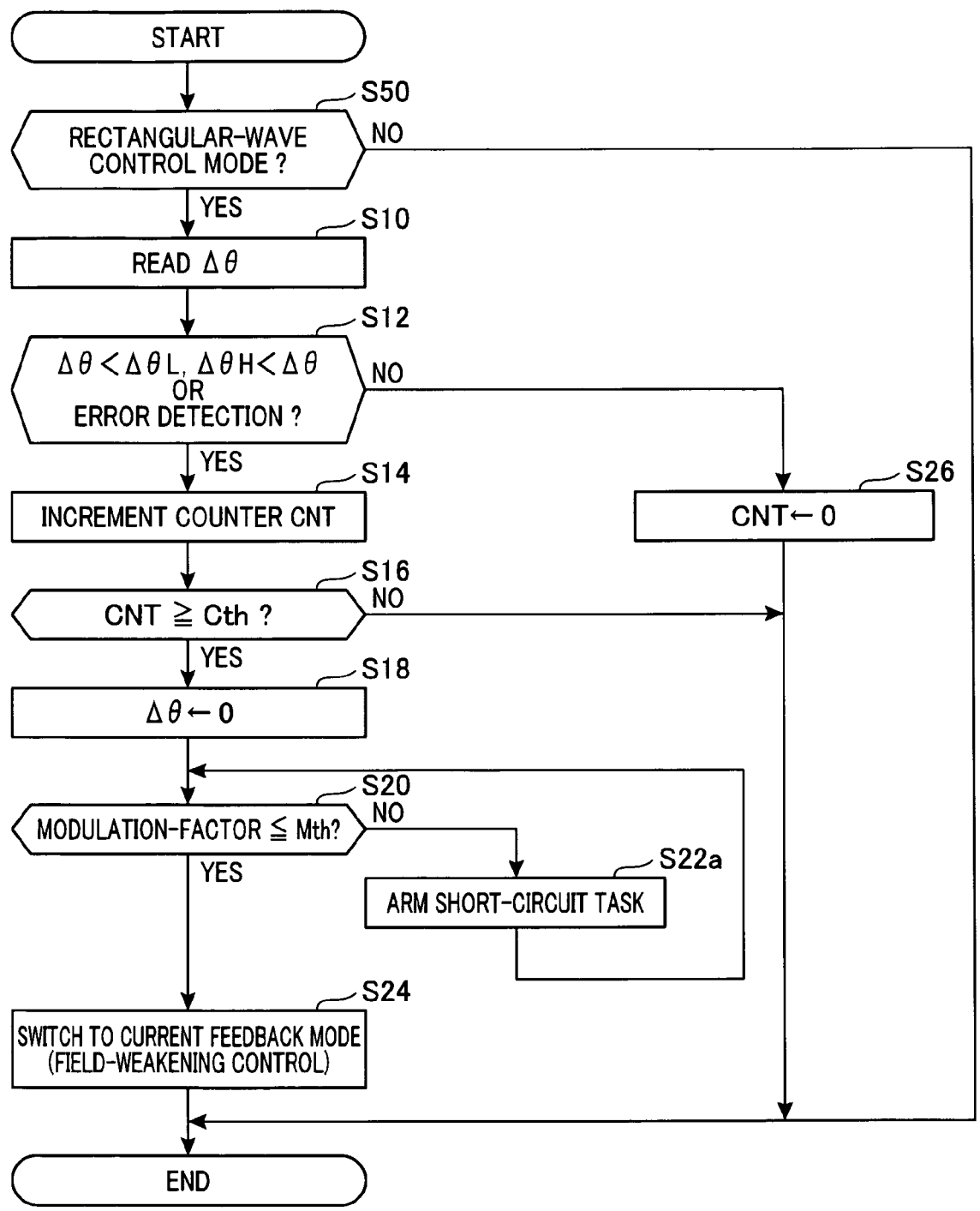
FIG. 11 is a flowchart schematically illustrating a fail-safe task to be executed by the MGECU according to the seventh embodiment of the present disclosure.

FIG. 11 schematically illustrates a fail-safe task to be executed by the CPU 14*a* of the MGECU 14 according to the seventh embodiment. The fail-safe task is, for example, programmed in the MGECU 14 to be repeatedly executed thereby at a preset cycle. In the fail-safe task illustrated in FIG. 5 and that illustrated in FIG. 11, like operations (steps) therebetween, to which like reference step numbers are assigned, are omitted or simplified in redundant description.

Starting the fail-safe task, the CPU 14*a* determines whether the torque-feedback control unit 20 operates in the rectangular-wave control mode in step S50.

When determining that the torque-feedback control unit 20 operates in the rectangular-wave control mode (YES in step S50), the CPU 14*a* performs the operations in steps S10 to S26 set forth above. Otherwise, when determining that the torque-feedback control unit 20 does not operate in the rectangular-wave control mode (NO in step S50), the CPU 14*a* terminates the fail-safe task, and waits for the next cycle.

The control system according to the seventh embodiment achieves the first to fifth advantages set forth above.

Eighth Embodiment

A control system for the motor-generator 10 according to the eighth embodiment of the present disclosure will be described with reference to FIGS. 12 and 13.

The structure and/or functions of the control system according to the eighth embodiment are different from the control system 50 by the following points. So, the different points will be mainly described hereinafter.

Figure 12:
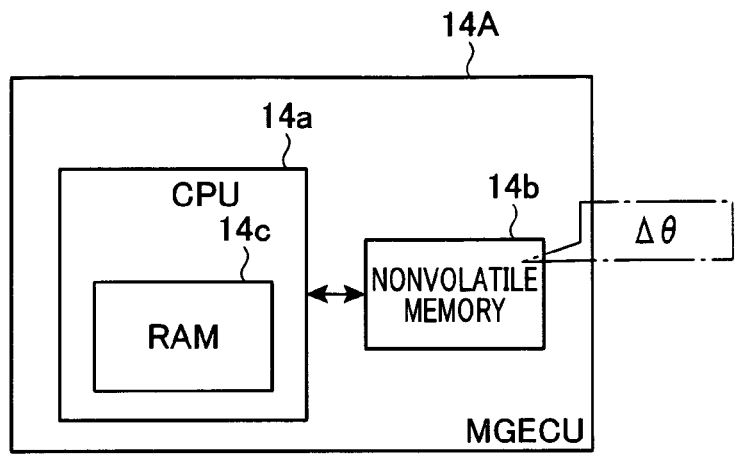
FIG. 12 is a block diagram schematically illustrating an example of the structure of a MGECU according to the eighth embodiment of the present disclosure.

FIG. 12 illustrates an example of the structure of a MGECU 14A according to the eighth embodiment.

The CPU 14*a* of the MGECU 14A includes therein a RAM 14*c*. The CPU 14*a* is programmed to write a correction value $\Delta\theta$ form for correcting the rotational angle $\delta$ measured by the rotational angle sensor 15 into the RAM 14*c*, and use the correction value $\Delta\theta$ stored in the RAM 14*c*.

Figure 13:
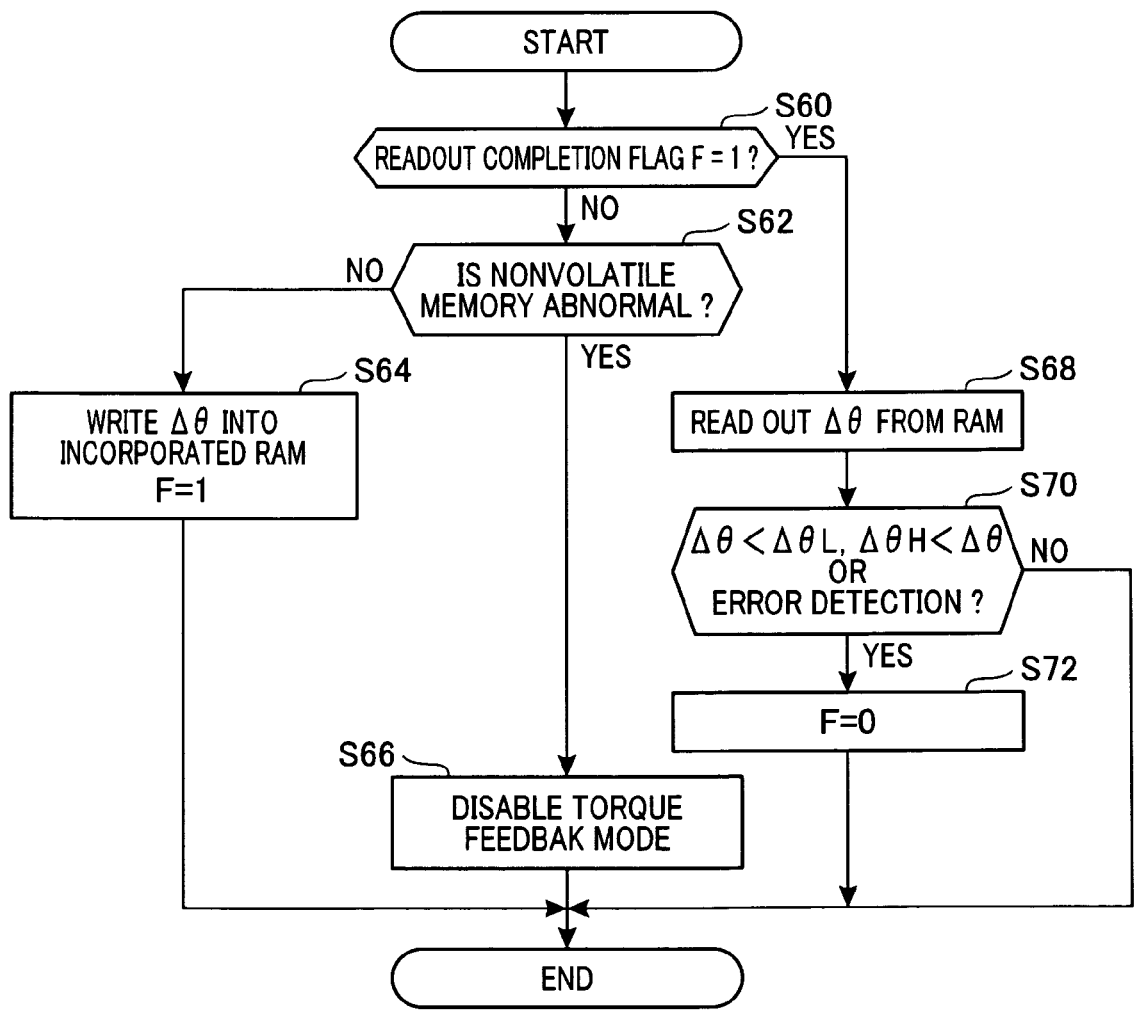
FIG. 13 is a flowchart schematically illustrating a fail-safe task to be executed by the MGECU according to the eighth embodiment.

FIG. 13 schematically illustrates a fail-safe task to be executed by the CPU 14*a* of the MGECU 14A according to the eighth embodiment. The fail-safe task is, for example, programmed in the MGECU 14A to be repeatedly executed thereby at a preset cycle.

Starting the fail-safe task, the CPU 14*a* determines whether a readout completion flag F is 1 in step S60. The readout completion flag F is one bit data and set to 1 when the load of the correction value $\Delta\theta$ read out from the nonvolatile memory 14*b* to the RAM 14*c* is completed. The readout completion flag F is, for example, stored in the RAM 14*c*, and is disabled (set to 0) when the MGECU 14A is deactivated.

When determining that the readout completion flag F is 0 (NO in step S60), the ECU 14*a* determines that the correction value $\Delta\theta$ has not been loaded to the RAM 14*c*. Then, the CPU 14*a* determines whether there is an abnormality in the nonvolatile memory 14*b* in step S62.

For example, in step S62, the CPU 14*a* determines that there is an abnormality in the nonvolatile memory 14*b* when it cannot read the correction value $\Delta\theta$ due to a fault in a communication line between the CPU 14*a* and the nonvolatile memory 14*b*, or when the determination in step S12 using the correction value $\Delta\theta$ red out from the nonvolatile memory 14*b* is affirmative.

Otherwise, when determining that there is not an abnormality in the nonvolatile memory 14*b* (NO in step S62), the CPU 14*a* writes the correction value $\Delta\theta$ into the RAM 14*c* installed in the CPU 14*a*, and sets the readout completion flag F to 1 in step S64. Otherwise, when determining that there is an abnormality in the nonvolatile memory 14*b* (YES in step S62), the CPU 14*a* disables torque adjustment by the torque-feedback control unit 20 in step S66.

On the other hand, when determining that the readout completion flag F is 1 (YES in step S60), the CPU 14*a* reads out the correction value Δθ stored in the RAM 14c incorporated therein in step S68. Next, the CPU 14a performs an operation identical to the operation in step S12 of FIG. 4, thus determining whether there is an abnormality in the correction value Δθ red out from the RAM 14c in step S70.

When determining that there is an abnormality in the correction value Δθ (YES in step S70), the CPU 14a sets the readout completion flag F to zero in step S72.

After completion of the operation in each of steps S64, S66, and S72, the CPU 14a terminates the fail-safe task, and waits for the next cycle. Similarly, when determining that there is not an abnormality in the correction value Δθ (NO in step S70), the CPU 14a terminates the fail-safe task, and waits for the next cycle.

The control system according to the eighth embodiment achieves the first to fifth advantages set forth above.

Ninth Embodiment

A control system for the motor-generator 10 according to the ninth embodiment of the present disclosure will be described with reference to FIGS. 14 and 15.

The structure and/or functions of the control system according to the ninth embodiment are different from the control system 50 by the following points. So, the different points will be mainly described hereinafter.

Figure 14:
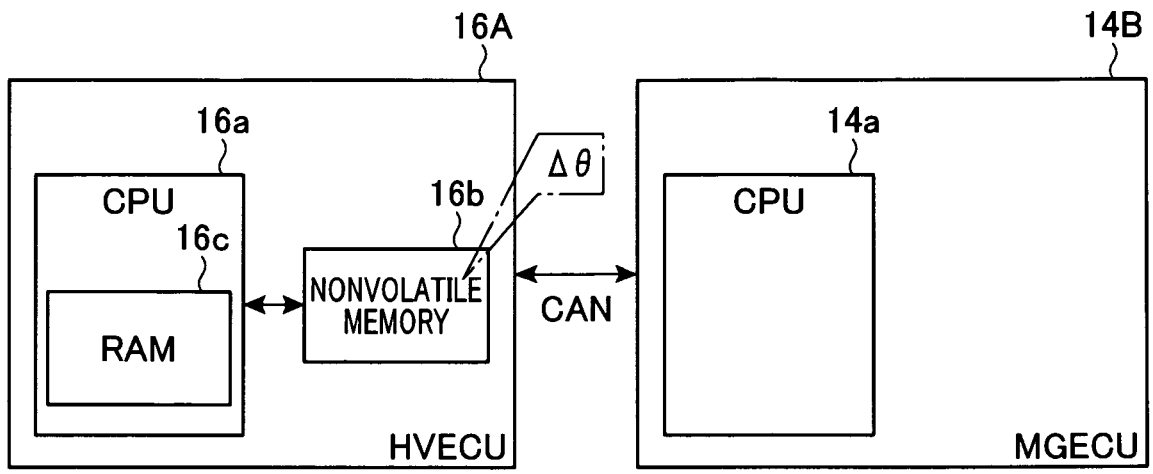
FIG. 14 is a block diagram schematically illustrating an example of the structure of a MGECU and a HVECU according to the ninth embodiment of the present disclosure.

FIG. 14 illustrates an example of the structure of a MGECU 14B and a HVECU 16A according to the ninth embodiment.

The HVECU 16A is designed as, for example, a computer circuit consisting essentially of, for example, a CPU 16a and a nonvolatile memory 16b. In the nonvolatile memory 16b, a correction value Δθ in digital from for correcting the rotational angle θ measured by the rotational angle sensor 15 is previously stored.

The CPU 16a includes therein a RAM 16c. The CPU 16a is programmed to load the correction value Δθ to the RAM 16c, and thereafter transmits in the CAN communication the correction value Δθ to the MGECU 14B. When receiving the correction value Δθ, the CPU 14a of the MGECU 14 uses it for adjusting the actual torque to the request torque Tr.

Figure 15:
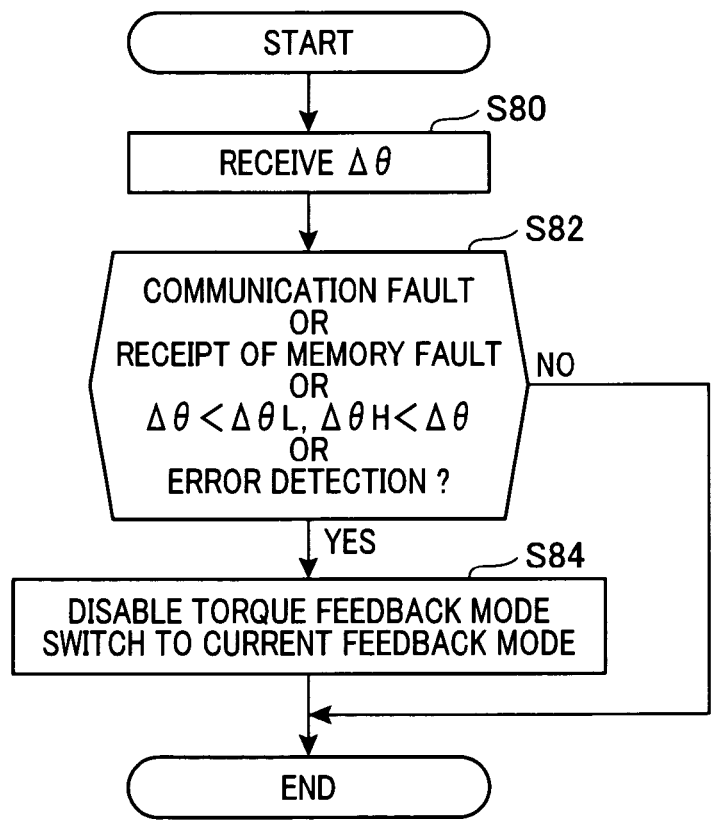
FIG. 15 is a flowchart schematically illustrating a fail-safe task to be executed by the MGECU according to the ninth embodiment.

FIG. 15 schematically illustrates a fail-safe task to be executed by the CPU 14a of the MGECU 14B according to the eighth embodiment. The fail-safe task is, for example, programmed in the MGECU 14B to be repeatedly executed thereby at a preset cycle.

Starting the fail-safe task, the CPU 14a receives the correction value Δθ transmitted from the HVECU 16A in step S80. Next, the CPU 14a determines whether there is an abnormality to disable using the accurate correction value Δθ in step S82. For example, in step S82, in addition to the comparison task between the correction value Δθ and each of the expected higher and lower limits ΔθH and ΔθL, and the abnormality determining task using the error detection code as well as step S12, the CPU 14a performs the following abnormality determining task.

Specifically, the CPU 14a determines whether there is an abnormality in the CAN communication itself using at least one well-known abnormality determining methods in CAN communications. In addition, the CPU 14a or the CPU 16a deter wines whether there is an abnormality in the correction value Δθ loaded from the nonvolatile memory 16b to be stored in the RAM 16c. For example, the CPU 14a or the CPU 16a determines whether there is an abnormality in the correction value Δθ stored in the RAM 16c using the comparison between the correction value Δθ and each of the expected higher and lower limits ΔθH and ΔθL, and the abnormality determination using the error detection code as well as step S12.

When determining that there is an abnormality to disable using the accurate correction value Δθ (YES in step S82), the CPU 14a disables the torque feedback control by the torque-feedback control unit 20, and switches from the torque feedback mode to the current feedback mode, thus performing the current feedback control by the current feedback control unit 30 in step S84. When switching from the torque feedback mode to the current feedback mode, the CPU 14a can perform the operations in steps S14 to S24 according to any of the first to third embodiments.

The control system according to the ninth embodiment achieves the first to fifth advantages set forth above.

Tenth Embodiment

A control system for the motor-generator 10 according to the tenth embodiment of the present disclosure will be described with reference to FIGS. 16 and 17.

The structure and/or functions of the control system according to the tenth embodiment are different from the control system according to the ninth embodiment by the following points. So, the different points will be mainly described hereinafter.

Figure 16:
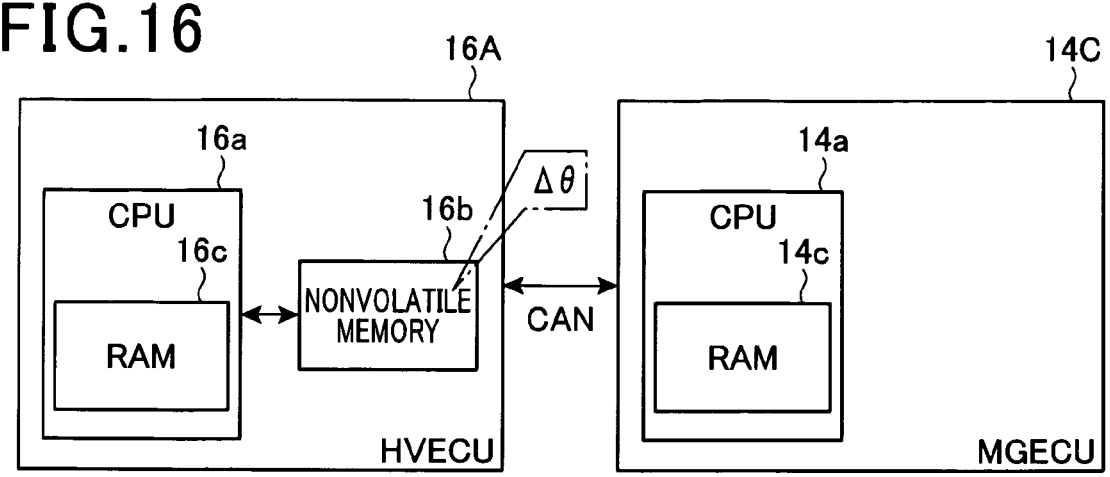
FIG. 16 is a block diagram schematically illustrating an example of the structure of a MGECU and a HVECU according to the tenth embodiment of the present disclosure.

FIG. 16 illustrates an example of the structure of a MGECU 14C and the HVECU 16A according to the tenth embodiment.

The CPU 14a of the MGECU 14C includes therein a RAM 14c. The CPU 16a of the HVECU 16A is programmed to load the correction value Δθ to the RAM 16c, and thereafter transmits in the CAN communication the correction value Δθ to the MGECU 14C. When receiving the correction value Δθ, the CPU 14a of the MGECU 14C uses it for adjusting the actual torque to the request torque Tr.

Figure 17:
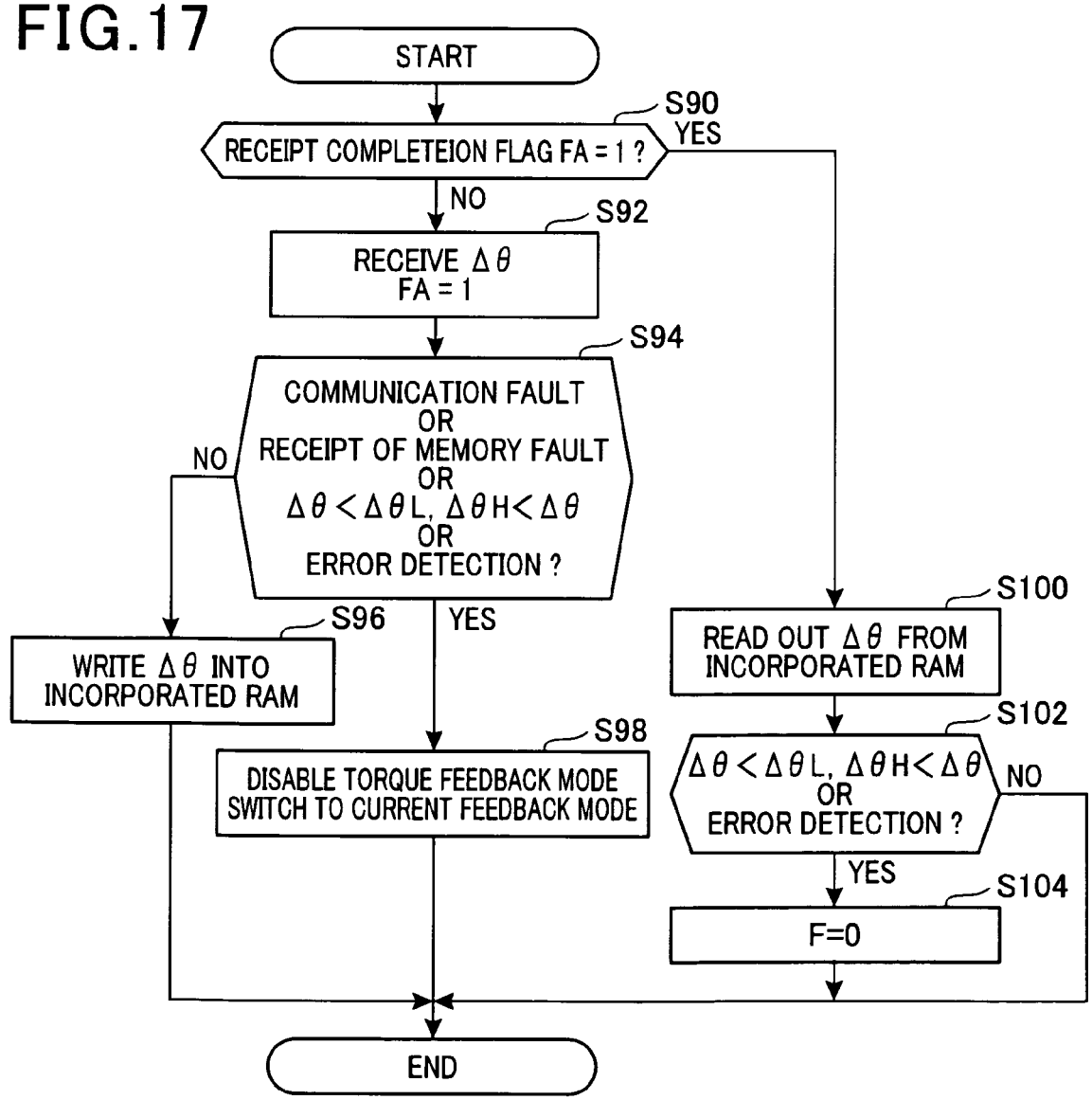
FIG. 17 is a flowchart schematically illustrating a fail-safe task to be executed by the MGECU according to the tenth embodiment.

FIG. 17 schematically illustrates a fail-safe task to be executed by the CPU 14a of the MGECU 14C according to the tenth embodiment. The fail-safe task is, for example, programmed in the MGECU 14C to be repeatedly executed thereby at a preset cycle.

Starting the fail-safe task, the CPU 14a determines whether a receipt completion flag FA is 1 in step S90. The receipt completion flag FA is one bit data and set to 1 when the receipt of the correction value Δθ transmitted from the HVECU 16A and the store of the correction value Δθ into the RAM 14c is completed. The receipt completion flag FA is for example, stored in the RAM 14c, and is disabled (set to 0) when the MGECU 14C is deactivated.

When determining that the receipt completion flag FA is 0 (NO in step S90), the ECU 14a performs a correction value receiving task to receive the correction value Δθ from the HVECU 16A, and sets the receipt completion flag FA to 1 in step S92.

Next, in step S94, the CPU 14a determines whether there is an abnormality to disable using the accurate correction value Δθ, which is basically identical to the determination in step S82 of FIG. 15. Preferably, in step S94, for determination of whether there is an abnormality in the CAN communication, the CPU 14a receives the correction value Δθ several times from the HVECU 16A, and determines whether there is an abnormality to disable using the accurate correction value Δθ by determining whether a previous value of the correction value Δθ is identical to a current value thereof.

When determining that there is not an abnormality to disable using the accurate correction value Δθ (NO in step S94), the CPU 14a writes the correction value Δθ into the RAM 14c installed in the CPU 14a. Otherwise, when determining that there is an abnormality to disable using the accurate correction value Δθ (YES in step S94), the CPU 14a proceeds to step S98. In step S98, the CPU 14a disables the torque feedback control by the torque-feedback control unit 20, and switches from the torque feedback mode to the current feedback mode, thus performing the current feedback control by the current feedback control unit 30. When switching from the torque feedback mode to the current feedback mode, the CPU 14a can perform the operations in steps S14 to S24 according to any of the first to third embodiments.

On the other hand, when determining that the receipt completion flag FA is 1 (YES in step S90), the CPU 14a reads out the correction value Δθ stored in the RAM 14c incorporated therein in step S100. Next, the CPU 14a performs an operation identical to the operation in step S12 of FIG. 4, thus determining whether there is an abnormality in the correction value Δθ red out from the RAM 14c in step S102.

When determining that there is an abnormality in the correction value Δθ (YES in step S102), the CPU 14a sets the receipt completion flag FA to zero in step S104.

After completion of the operation in each of steps S96, S98, and S104, the CPU 14a terminates the fail-safe task, and waits for the next cycle. Similarly, when determining that there is not an abnormality in the correction value Δθ (NO in step S102), the CPU 14a terminates the fail-safe task, and waits for the next cycle.

The control system according to the tenth embodiment achieves the first to fifth advantages set forth above.

The first to tenth embodiments and their modifications can be changed and/or modified within the scope of the present invention.

In the fourth embodiment, the CPU 14a can skip the determination in step S30, and carry out both the retarding of the upper limit of the phase manipulatable range and the advancing the lower limit of the phase manipulatable range.

The norm setter 21 is not limited to a norm setter provided with the map M3 representing a function (relationship) between a variable of the request torque Tr, a variable of the angular velocity ω of the motor-generator 10, and a variable of the norm Vn of the output voltage vector of the inverter IV. Specifically, the noun setter 21 can be configured to calculate, in accordance with a well known voltage equation representing the function of a command voltage component (that is, the d- and q-axis command voltages) and a command current component (that is, the command d- and q-axis current components idr and iqr set by the command current setter 31) corresponding to the request torque Tr.

The torque-feedback control unit 20 is configured to manipulate the norm Vn of the output voltage vector of the inverter IV based on the open loop control using the request torque Tr, but the present disclosure is not limited thereto. Specifically, the torque-feedback control unit 20 can be configured to correct, based on a manipulated variable for feedback control of a d-axis current component to the d-axis command current component idr, the norm Vn set by the norm setter 21. The d-axis command current component idr can be set to be identical to a current expected to determine the norm Vn based on the request torque Tr and the angular velocity ω. Specifically, when the norm Vn is set by the nom setter 21 to carry out the maximum torque control with minimum armature current, the d-axis command current component idr is expected to carry out the maximum torque control with minimum armature current.

The norm Vn can be set by the norm setter 21 to carry out another control for the motor-generator 10, such as maximum efficiency control for the motor-generator 10.

In the first embodiment, the CPU 14a can limit, as means for reducing the modulation factor of the inverter IV, the phase δ as a manipulated variable for the torque feedback control in the same manner as the fourth embodiment.

As means for reducing the modulation factor of the inverter IV, the present disclosure is not limited to various means described in the respective embodiments. For example, when the torque feedback mode is switched to the current feedback mode due to the occurrence of an abnormality, the current feedback control unit 30 can be configured to:

adjust the actual torque of the motor-generator 10 to the request torque Tr based on instantaneous current control; and set command current values for the respective phase windings such that the command current values meet a value of the request torque Tr smaller than a value of the request torque Tr requested immediately before the occurrence of the abnormality. Note that the instantaneous current control is, for example, designed to use hysteresis comparators to directly adjust the instantaneous phase current iu for the U-phase winding, the instantaneous phase current iv for the V-phase winding, and the instantaneous phase current iw for the W-phase winding.

The current feedback control unit 30 is not limited to the structures exemplified in the aforementioned embodiments. Specifically, the current feedback control unit 30 can be designed to calculate the command voltages vdr and vqr without considering feedforward manipulated values for the d- and q-axis currents. The feedback control unit 30 can be designed to use a proportional-integral-derivative feedback algorithm or an integral feedback algorithm in place of the proportional integral, feedback algorithm.

The command current setter 31 is not limited to the structure to carry out the field-weakening control when the modulation factor of the inverter IV is equal to or smaller than the switching threshold Mth, and can be configured to carry out another method to set the command d- and q-axis current components idr and iqr.

The current feedback control unit 30 can be configured to adjust the actual torque of the motor-generator 10 to the request torque Tr based on three-phase command currents iur, ivr, and iwr for the three-phase instantaneous currents iu, iv, and iw as manipulated variables in place of the three-phase command voltages vur, vvr, and vwr.

Estimating means according to the present disclosure is not limited to means for calculating an estimated torque Te to be created by the motor-generator 10 based on measured current values iu, iv, and iw by the current sensors 16, 17, and 18. Specifically, the estimating means can be configured to calculate, based on the phase δ and the norm of the output voltage vector of the inverter IV, and the angular velocity ω of the motor-generator 10, an estimated torque in accordance with equation (c4) disclosed in the U.S. Pat. No. 8,018,185B2. Note that the norm of the output voltage vector of the inverter IV can be calculated based on the input voltage of the inverter IV and the modulation factor of the inverter IV. The estimating means can be configured to estimate armature current flowing in the motor-generator 10 based on the output voltage of the inverter IV and the angular velocity of the motor-generator 10, thus calculating an estimated torque based on the estimated armature current.

The control system according to each of the first to tenth embodiment is configured to deter that there is an abnormality to disable using the accurate correction value Δθ when the number of times there is a provisional abnormality in the correction value Δθ in steps S12 to S16 and S26, but the present disclosure is not limited thereto. Specifically, after a given number of times (a provisional abnormal number) there is a provisional abnormality in the correction value Δθ have been counted, when there is not an abnormality in the correction value Δθ (NO in step S12), the CPU 14a can decrement the provisional abnormal number corresponding to the provisionally abnormal counter CNT by 1 in step S26. This modification can also improve the accuracy of determining whether there is an abnormality to disable using the accurate correction value Δθ in comparison to determining that there is an abnormality to disable using the accurate correction value Δθ immediately when there is a single provisional abnormality in the correction value Δθ is counted.

As an AC (Alternating Current) voltage applying circuit, the inverter IV is used, but the present disclosure is not limited thereto. Specifically, a chopper power converter including a switching member electrically connected to the converter CV, and a power accumulator electrically connected to the switching member can be used as the AC voltage applying unit. In this modification, the MGECU 14 can be configured to calculate, based on a command voltage to the motor-generator 10, a command value for an output current to the power accumulator and the motor-generator 10. The MGECU 14 can be configured to carry out chopper control of the chopper power converter by switching on and off the switching member based on the command value for the output current to thereby convert a voltage across the power accumulator into a desired AC voltage relation to the power supply voltage of the converter CV. The chopper power converter is disclosed, for example, in US Patent Application Publication No. 2009/0200970A1 assigned to the same assignee as that of this application. Thus, the disclosures of the US patent application publication are all incorporated herein by reference.

The actual rotational angle θ and/or angular velocity ω can be estimated based on, for example, actual d-axis and q-axis currents without using the rotational angle sensor 15.

In each of the first to tenth embodiments and their modifications, as the salient-pole rotary machine, an IPMSM is used, but another type of salient-pole rotary machines, such as a Synchronous Reluctance Motor, can be used.

Various types of rotary machines according to the present disclosure can be installed in various types of vehicle, such as an electric automobile. Various types of rotary machines to which the present invention can be applied are not limited to a component of a drive system of vehicles, such as a rotary machine to be installed in a power steering system.

As a DC power source to be connected with the input terminals of the inverter IV, the converter CV is used but the present disclosure is not limited thereto. Specifically, a high voltage battery can be used for the battery 12, and can be directly connected with the input terminals of the inverter IV without provided with the converter CV.

While illustrative embodiments of the present disclosure has been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A system for controlling a rotary machine, the system comprising:
 a circuit configured to output an AC (Alternating Current) voltage to be applied to the rotary machine;
 a measuring unit configured to measure a rotational angle of the rotary machine;
 a storage configured to store therein measurement-error information indicative of a measurement error of the measuring unit;
 a torque-feedback adjuster configured to manipulate a phase of the output voltage of the circuit based on the rotational angle of the rotary machine measured by the measuring unit and the measurement-error information to adjust a torque of the rotary machine to a request torque for the rotary machine, the phase being obtained from information fed back from the rotary machine;
 an abnormality determiner configured to determine whether there is an abnormality using the measurement-error information stored in the storage according to at least one of:
 comparison of the measurement-error information stored in the storage with a preset value; and
 an error detection code if the error detection code is included in the measurement-error information stored in the storage; and
 a limiter configured to limit adjustment of the torque of the rotary machine to the request torque by the torque-feedback adjuster when it is determined that there is an abnormality using the measurement-error information stored in the storage,
 wherein, when it is determined that there is the abnormality using the measurement-error information stored in the storage, the limiter is configured to perform one of:
 switching from an operation of the torque-feedback adjuster to an operation that adjusts a current actually flowing in the rotary machine to a command current, the current actually flowing in the rotary machine being associated with the torque of the rotary machine, the command current is set based on the request torque and the information fed back from the rotary machine;
 reducing a phase manipulatable range defined from an upper limit in a phase-lead direction to a lower limit in a phase-retard direction, the torque-feedback adjuster being configured to manipulate the phase of the output voltage of the circuit within the phase manipulatable range; and
 limiting an absolute value of the request torque.

2. The system according to claim 1, wherein the circuit is a converter having a switching member and configured to drive the switching member to generate, from a DC (Direct Current) voltage inputted thereto, the AC voltage to be applied to the rotary machine, and the limiter is configured to switch from the torque-feedback adjuster to a current-feedback adjuster for adjustment of the torque of the rotary machine to the request torque if a modulation factor of the converter is equal to or smaller than a threshold.

3. The system according to claim 2, wherein the limiter further comprises:
 a modulation-factor reducer configured to reduce the modulation factor of the converter in adjustment of the torque of the rotary machine to the request torque so that the reduced modulation factor is equal to or lower than the threshold.

4. The system according to claim 3, wherein the modulation-factor reducer is configured to cause the torque-feedback adjuster to perform adjustment of the torque of the rotary machine to the request torque to reduce the modulation factor of the converter.

5. The system according to claim 3, wherein the modulation-factor reducer is configured to cause the torque-feedback adjuster to perform, while keeping unchanged the phase of the output voltage of the converter, adjustment of the torque of the rotary machine to the request torque to reduce the modulation factor of the converter.

6. The system according to claim 3, wherein the rotary machine is a multiphase rotary machine, the converter is a multiphase converter having, as the switching member, a pair of high-side and low-side switching members for each phase of the multiphase rotary machine, and the modulation-factor reducer is configured to turn on one of: the high-side switching member for each phase of the multiphase rotary machine; and the low-side switching member for each phase of the multiphase rotary machine to reduce a rotational speed of the rotary machine at timing to start adjustment of the torque of the rotary machine to the request torque by the current-feedback adjuster.

7. The system according to claim 3, wherein the rotary machine has a field flux, and the rotary machine is configured to rotate based on the field flux thereof and the AC voltage applied to the rotary machine, and the current-feedback adjuster is configured to perform field-weakening control to reduce the filed flux of the rotary machine.

8. The system according to claim 3, wherein the limiter is configured to switch from the torque-feedback adjuster to the current-feedback adjuster for adjustment of the torque of the rotary machine to the request torque based on at least one of: the torque of the rotary machine, the current actually flowing in the rotary machine, the output voltage of the converter, and the modulation factor with the modulation-factor reducer reducing the modulation factor of the converter.

9. The system according to claim 1, wherein the rotary machine comprises a stator and a rotor rotatable relative to the stator as rotation of the rotary machine, the rotor has a field flux and a d-q coordinate system with a d-axis and a q-axis, the d-axis representing a direction of the field flux of the rotary machine, the q-axis having a phase that leads with respect to the d-axis by an electric angle of $\pi/2$ radians during rotation of the rotor, and the current-feedback adjuster is configured to:
set a first command voltage on the d-axis and a second command voltage on the q-axis as manipulated variables for adjusting the current actually flowing in the rotary machine to the command current;
convert, based on the rotational angle of the rotary machine and the measurement-error information, the first and second command voltages into a stator command voltage to be applied to the stator; and
convert, based on the rotational angle of the rotary machine, the first and second command voltages into a stator command voltage to be applied to the stator while the limiter limits adjustment of the torque of the rotary machine to the request torque by the torque-feedback adjuster.

10. The system according to claim 1, wherein the limiter is configured to limit manipulation of the phase.

11. The system according to claim 10, wherein the torque-feedback adjuster configured to manipulate the phase of the output voltage of the circuit within a preset phase manipulatable range defined from an upper limit in a phase-lead direction to a lower limit in a phase-retard direction, and
the limiter is configured to reduce the phase manipulatable range.

12. The system according to claim 11, wherein the rotary machine is installed in a vehicle, the system further comprising a determiner configured to determine whether the rotary machine operates in a power running control mode for the vehicle or in a regenerative mode control mode therefor;
the limiter is configured to retard the upper limit of the phase manipulatable range when it is determined that the rotary machine operates in the power running control mode, and to advance the lower limit of the phase manipulatable range when it is determined that the rotary machine operates in the regenerative control mode.

13. The system according to claim 10, wherein the limiter is configured to limit an absolute value of the request torque while limiting manipulation of the phase.

14. The system according to claim 10, wherein the limiter is configured to eliminate the measurement-error information, and the torque-feedback adjuster configured to manipulate the phase of the output voltage of the circuit based on the rotational angle of the rotary machine measured by the measuring unit.

15. The system according to claim 1, wherein the torque-feedback adjuster further comprises a norm setter configured to set a norm of a vector of the output voltage of the circuit based on the request torque for the rotary machine and the rotational speed of the rotary machine.

16. The system according to claim 15, wherein the circuit is a converter having a switching member and configured to drive the switching member to generate, from a DC (Direct Current) voltage inputted thereto, the AC voltage to be applied to the rotary machine, and the torque-feedback adjuster further comprises;
a waveform determiner configured to determine, based on the norm of the output voltage vector and the input DC voltage of the converter, a waveform of a drive signal to be applied to the switching member; and
an output unit configured to output, to the switching member of the converter, the drive signal with the determined waveform.

17. The system according to claim 15, wherein the rotary machine comprises a stator and a rotor rotatable relative to the stator as rotation of the rotary machine, the circuit is a converter having a switching member and configured to drive the switching member to generate, from a DC (Direct Current) voltage inputted thereto, the AC voltage to be applied to the rotary machine, and the torque-feedback adjuster is configured to:
compare in magnitude a command voltage having the norm set by the norm setter and the phase manipulated thereby for the stator with a carrier wave to thereby generate a drive signal to be applied to the switching member.

18. The system according to claim 15, wherein the circuit is a converter having a pair of high- and low-side switching members and configured to drive selectively on and off the pair of switching members to generate, from a DC (Direct Current) voltage inputted thereto, the AC voltage to be applied to the rotary machine, and the torque-feedback adjuster is configured to perform rectangular-wave control such that an on duration of one of the high- and low-side switching elements is substantially matched with one half of a corresponding period of rotation of the rotary machine, and an on duration of the other thereof is substantially matched with the remaining half of the corresponding period of rotation of the rotary machine.

19. The system according to claim 1, further comprising:
an estimator configured to estimate the torque of the rotary machine based on at least one of a map and an equation, the at least one of the map and the equation having an input parameter, the input parameter being at least one of:
the phase of the output voltage of the circuit, the norm of the output voltage vector of the circuit, the angular velocity of the rotary machine, and a current actually flowing in the rotary machine, each of the map and the equation representing a relationship between a variable of the estimated torque of the rotary machine and the input parameter.

20. The system according to claim 1, wherein the circuit, the measuring unit, the abnormality determiner, and the limiter configured to limit adjustment of the torque of the rotary machine to the request torque by the torque-feedback adjuster collectively constitute an apparatus for controlling the rotary machine, the system further comprises: an external device communicable with the apparatus, the external device including the storage, and an obtainer configured to obtain the measurement-error information from the storage, and the abnormality determiner is configured to determine, based on the measurement-error information obtained from the storage, whether there is the abnormality using the measurement-error information stored in the storage when there is an abnormality in an output of the measurement-error information from the external device.

21. The system according to claim 20, wherein the apparatus comprises an integral storage in which the measurement-error information is to be stored, and the abnormality determiner is configured to, when the measurement-error information has been stored in the integral storage, determine whether there is the abnormality using the measurement-error information stored in the storage based on the measurement-error information stored in the integral storage.

22. The system according to claim 1, wherein the circuit, the measuring unit, the abnormality determiner, and the limiter configured to limit adjustment of the torque of the rotary machine to the request torque by the torque-feedback adjuster collectively constitute an apparatus for controlling the rotary machine, the apparatus comprises an integral storage, the system further comprises: an external device communicable with the apparatus, the external device including the storage and store the measurement-error information in the internal storage, and an obtainer configured to obtain the measurement-error information from the storage, and the abnormality determiner is configured to determine whether there is the abnormality using the measurement-error information stored in the storage when there is an abnormality in the integral storage.

23. The system according to claim 1, further comprising a nonvolatile memory as the storage, wherein the abnormality determiner is configured to determine whether there is the abnormality using the measurement-error information stored in the storage when there is an abnormality in the nonvolatile memory.

24. The system according to claim 23, further comprising an integral storage in addition to the nonvolatile memory, the system further comprises a loader configured to load the measurement-error information stored in the nonvolatile memory to the integral storage, and the abnormality determiner is configured to, when the measurement-error information has been stored in the integral storage, determine whether there is the abnormality using the measurement-error information stored in the storage based on the measurement-error information stored in the integral storage.

* * * * *